(12) United States Patent
Cavallaro et al.

(10) Patent No.: US 8,401,304 B2
(45) Date of Patent: Mar. 19, 2013

(54) DETECTING AN OBJECT IN AN IMAGE USING EDGE DETECTION AND MORPHOLOGICAL PROCESSING

(75) Inventors: Richard H. Cavallaro, Mountain View, CA (US); Vidya Elangovan, Sunnyvale, CA (US)

(73) Assignee: Sportvision, Inc., Chicago, IL (US)

( * ) Notice: Subject to any disclaimer, the term of this patent is extended or adjusted under 35 U.S.C. 154(b) by 1479 days.

(21) Appl. No.: 11/960,565

(22) Filed: Dec. 19, 2007

(65) Prior Publication Data
US 2009/0028385 A1 Jan. 29, 2009

Related U.S. Application Data

(60) Provisional application No. 60/952,519, filed on Jul. 27, 2007.

(51) Int. Cl.
*G06K 9/48* (2006.01)
(52) U.S. Cl. .......................... 382/199; 348/135; 715/247
(58) Field of Classification Search .................. 382/100, 382/181, 190, 195, 199, 203; 348/92, 125, 348/126, 135; 715/247
See application file for complete search history.

(56) References Cited

U.S. PATENT DOCUMENTS

| | | | |
|---|---|---|---|
| 5,917,553 A | 6/1999 | Honey et al. | |
| 6,088,521 A | 7/2000 | Strumolo et al. | |
| 6,100,925 A | 8/2000 | Rosser et al. | |
| 6,151,009 A | 11/2000 | Kanade et al. | |
| 6,940,538 B2 | 9/2005 | Rafey et al. | |
| 6,990,681 B2 | 1/2006 | Wang et al. | |
| 7,046,273 B2 | 5/2006 | Suzuki | |
| 7,211,000 B2 | 5/2007 | Jutzi et al. | |
| 7,230,653 B1 | 6/2007 | Overton et al. | |
| 2004/0006424 A1 | 1/2004 | Joyce et al. | |
| 2004/0100556 A1 | 5/2004 | Stromme | |
| 2004/0126013 A1 | 7/2004 | Olson | |
| 2005/0001852 A1* | 1/2005 | Dengler et al. ................ 345/633 |

FOREIGN PATENT DOCUMENTS

WO   WO2007/076893   7/2007

OTHER PUBLICATIONS

International Preliminary Report dated Feb. 11, 2010 in International Application No. PCT/US2008/071165 filed Jul. 25, 2008.
"ESPN, Sportvision track drafting during NASCAR races," New World Ventures, Feb. 18, 2007.
"ESPN Draft Track Technology Will Allow NASCAR Fans to 'See the Air'", The Post Chronicle, Jul. 25, 2007.
A. Treuille et al., "Model reduction for real-time fluids," ACM Transactions on graphics 25(3), SIGGRAPH 2006, p. 826-834, 2006.
S. Smith, "The Scientists and Engineer's Guide to Digital Signal Processing," Morphological Image Processing, pp. 436-442, 1997.

(Continued)

*Primary Examiner* — Anand Bhatnagar
(74) *Attorney, Agent, or Firm* — Vierra Magen Marcus LLP

(57) ABSTRACT

A representation of an object in a live event is detected in an image of the event. A location of the object in the live event is translated to an estimated location in the image based on camera sensor and/or registration data. A search area is determined around the estimated location in the image. A direction of motion of the object in the image is also determined. A representation of the object is identified in the search area by detecting edges of the object, e.g., perpendicular to the direction of motion and parallel to the direction of motion, performing morphological processing, and matching against a model or other template of the object. Based on the position of the representation of the object, the camera sensor and/or registration data can be updated, and a graphic can be located in the image substantially in real time.

25 Claims, 22 Drawing Sheets

OTHER PUBLICATIONS

H. Hickey, "Computers Expose the Physics of NASCAR," Univ. of Washington, Aug. 9, 2007.

B. Sauser, "Animating Airflow," Technology Review, Jul. 27, 2007.

R. Lewis, "Aston Martin Beats the 24 Hour Clock," Fluent News, Lebanon, NH, vol. 15, issue 2, Summer 2006, pp. 1-8 (excerpt).

U.S. Appl. No. 11/960,586, filed Dec. 19, 2007, titled "Providing Virtual Inserts Using Image Tracking With Camera and Position Sensors".

U.S. Appl. No. 11/960,527, filed Dec. 19, 2007, titled "Providing Graphics in Images Depicting Aerodynamic Flows and Forces".

U.S. Appl. No. 11/960,606, filed Dec. 19, 2007, titled "Identifying an Object in an Image Using Color Profiles".

U.S. Appl. No. 11/960,571, filed Dec. 19, 2007, titled "Detecting an Object in an Image Using Multiple Templates".

U.S. Appl. No. 11/960,577, filed Dec. 19, 2007, titled "Detecting an Object in an Image Using Templates Indexed to Location or Camera Sensors".

U.S. Appl. No. 11/960,600, filed Dec. 19, 2007, titled "Detecting an Object in an Image Using Camera Registration Data Indexed to Location or Camera Sensors".

International Search Report and Written Opinion of the International Searching Authority, dated Sep. 18, 2008, PCT Appl. No. PCT/US2008/071165.

* cited by examiner

Search area, 210    Bounding box, 215    Video image, 200

Object, 220

Template of object, 300

Image obtained after morphological processing, 600

Template of object, 700

Fig. 8   Object, 800   Object, 810
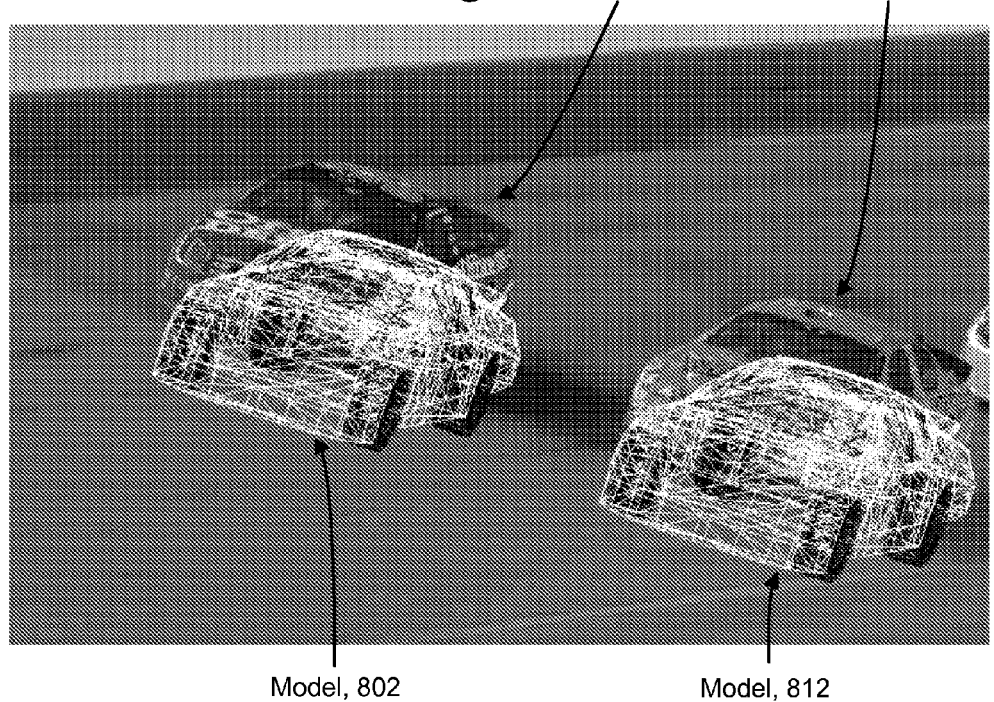
Model, 802   Model, 812
Fig. 9a
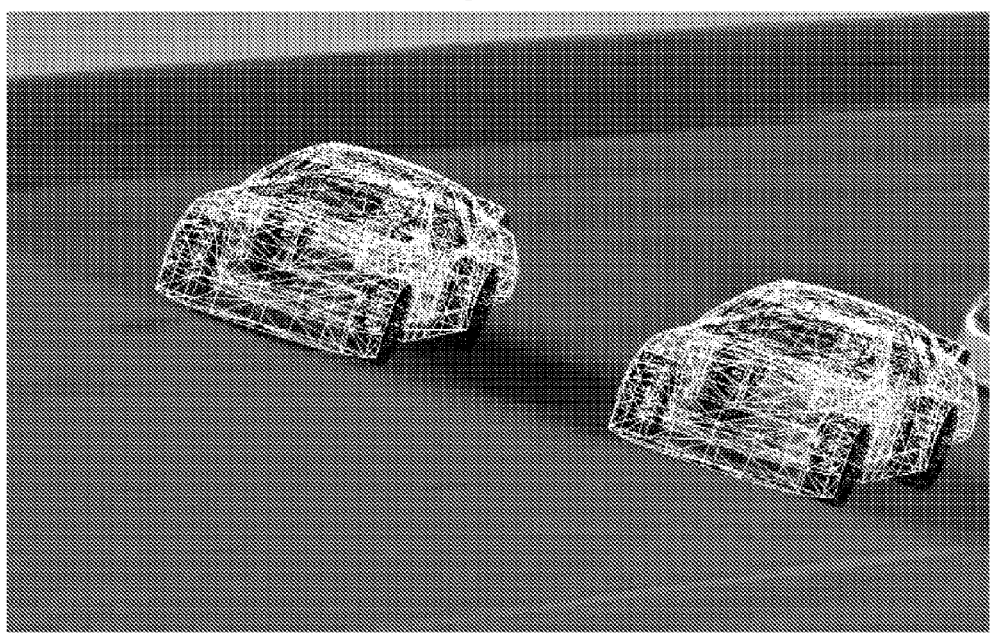

Fig. 10  Object, 1000    Object, 1010
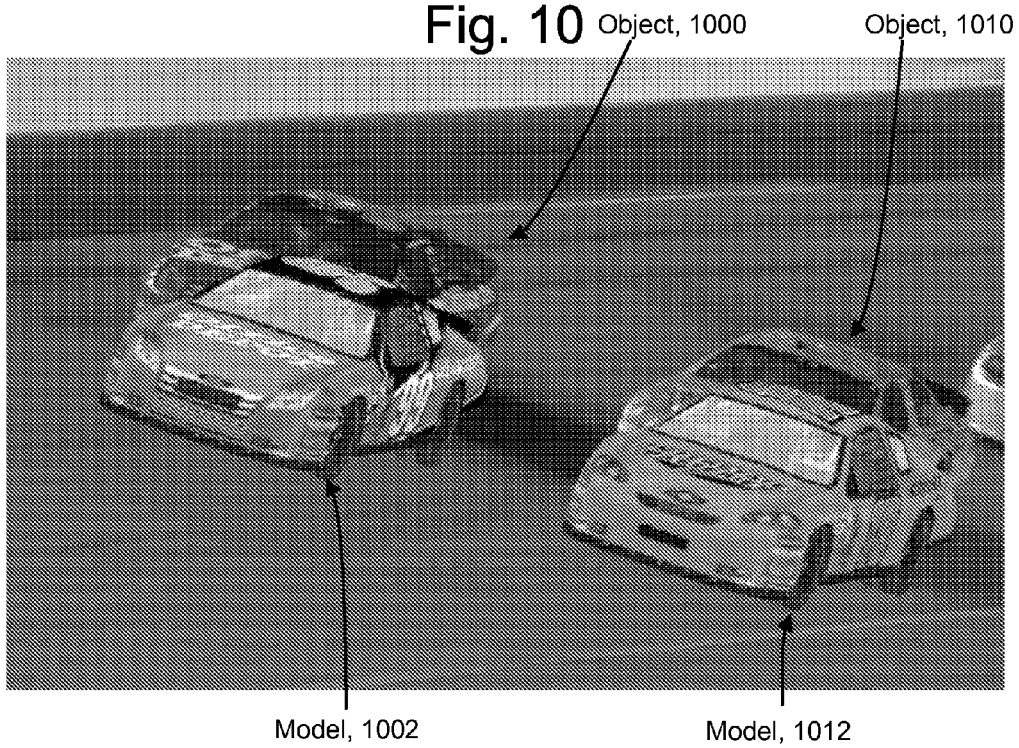
Model, 1002    Model, 1012
Fig. 11
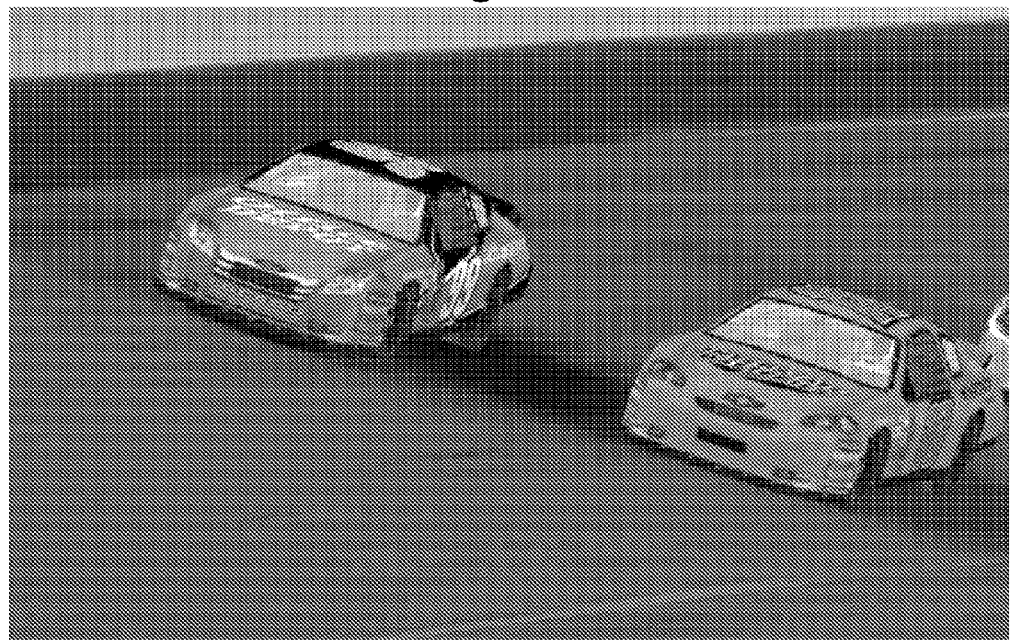

Fig. 14a

1400 Determine orientation of object

1402 Determine location of object in live event

1404 Obtain camera registration data and distance between camera and object

1406 Determine estimated size, orientation and position of the object in the image

1408 Determine search area

1410 Define template based on estimated size, orientation and position of object in image

1412 Search for representation of the object in the image by correlation with template

1414 Update camera registration and/or sensor data

1416 Update location data

Fig. 14b

1420 Update camera registration and/or sensor data

1422 Determine camera registration and/or sensor data which corresponds to detected position of object in image

1424 Determine offset to camera registration and/or sensor data based on offset between detected position of object in image and position based on location data

1426 Apply offset to camera registration and/or sensor data for current and/or subsequent

Fig. 14c

1430 Update location data

1432 Transform detected position of object in image from pixel space to updated location in world coordinates

1434 Determine offset in world coordinates between original location and updated location

1436 Apply offset to location data for current and/or subsequent image

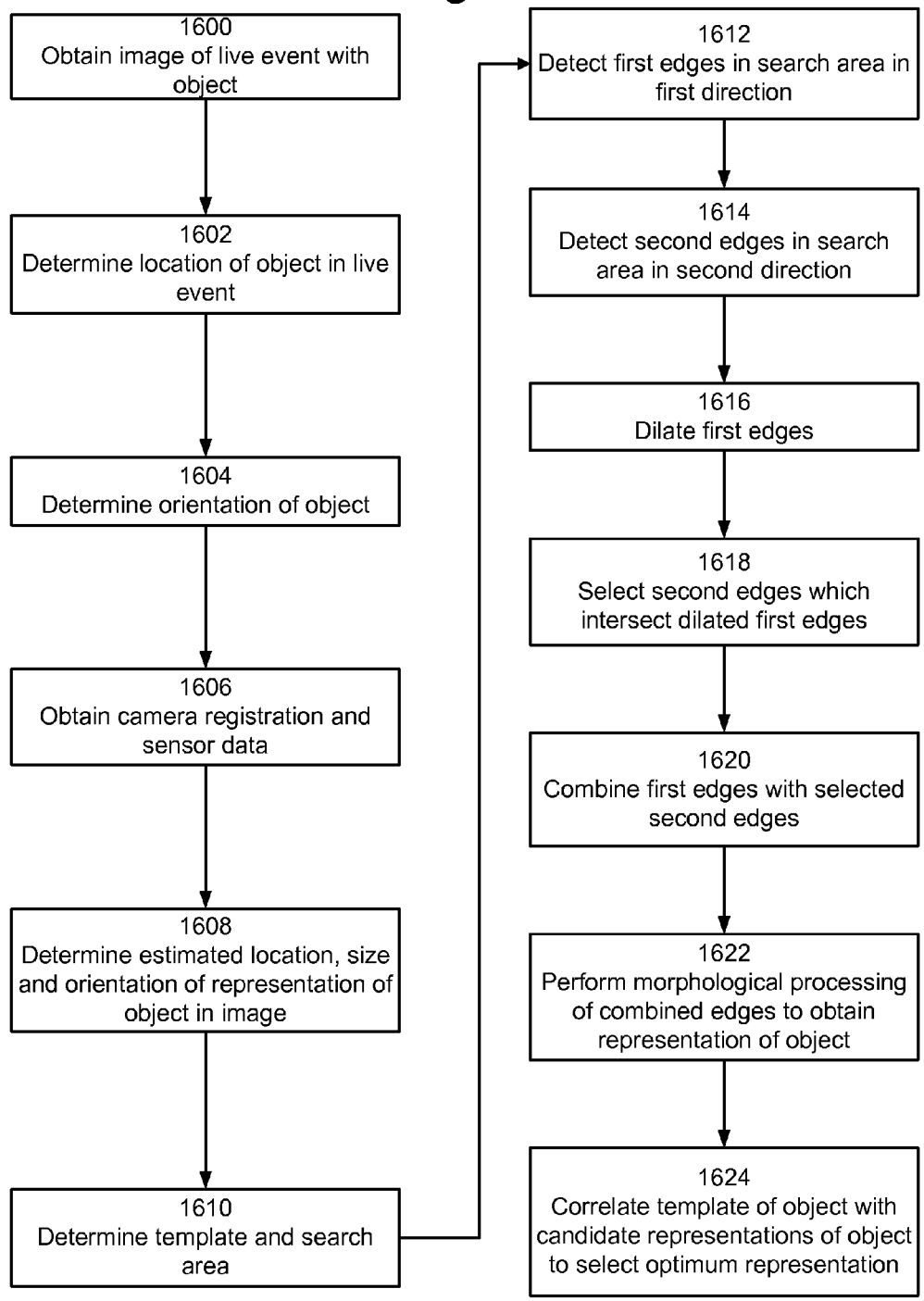

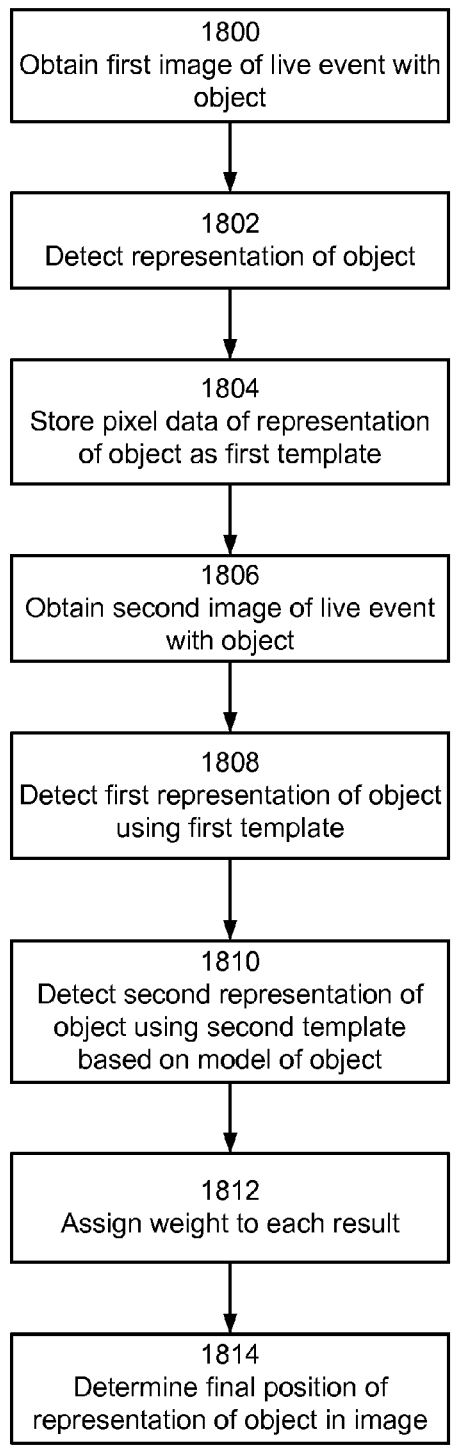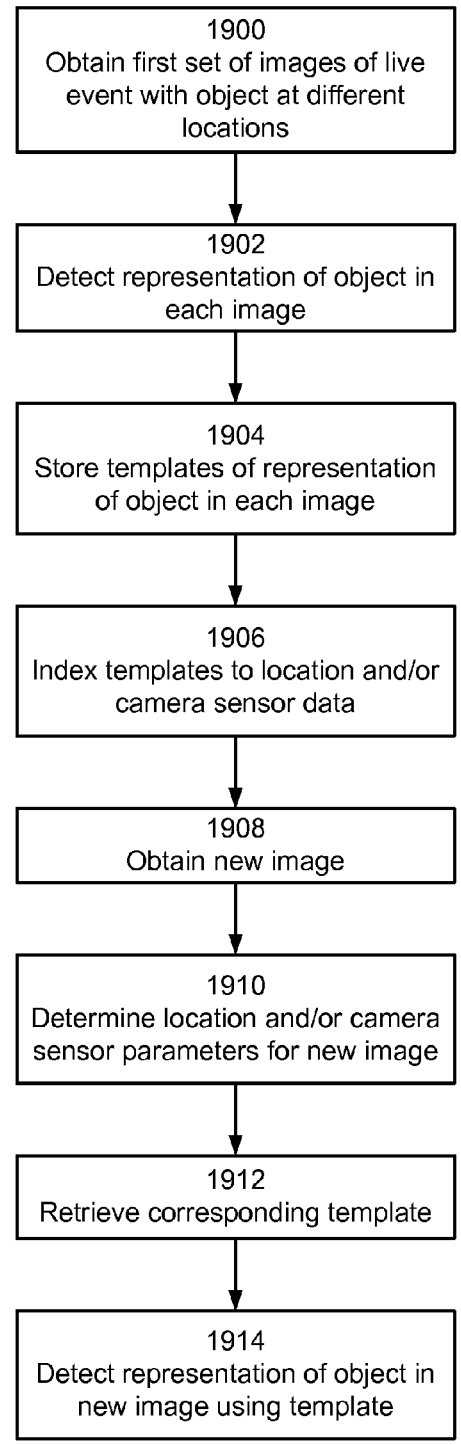

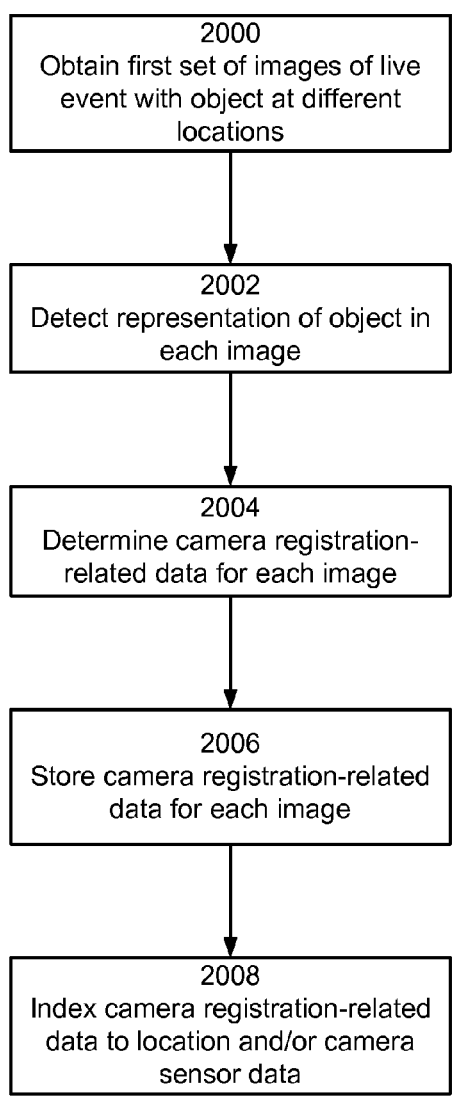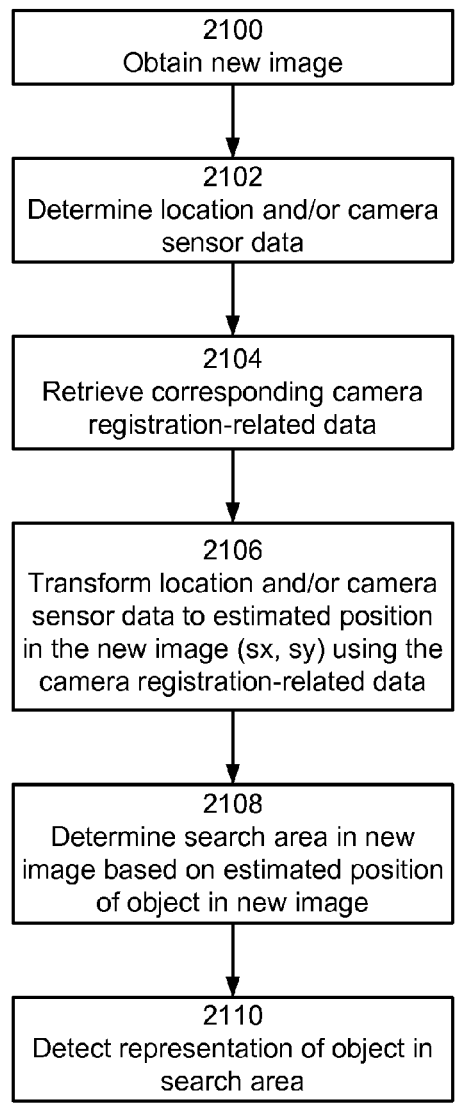

Color space bins

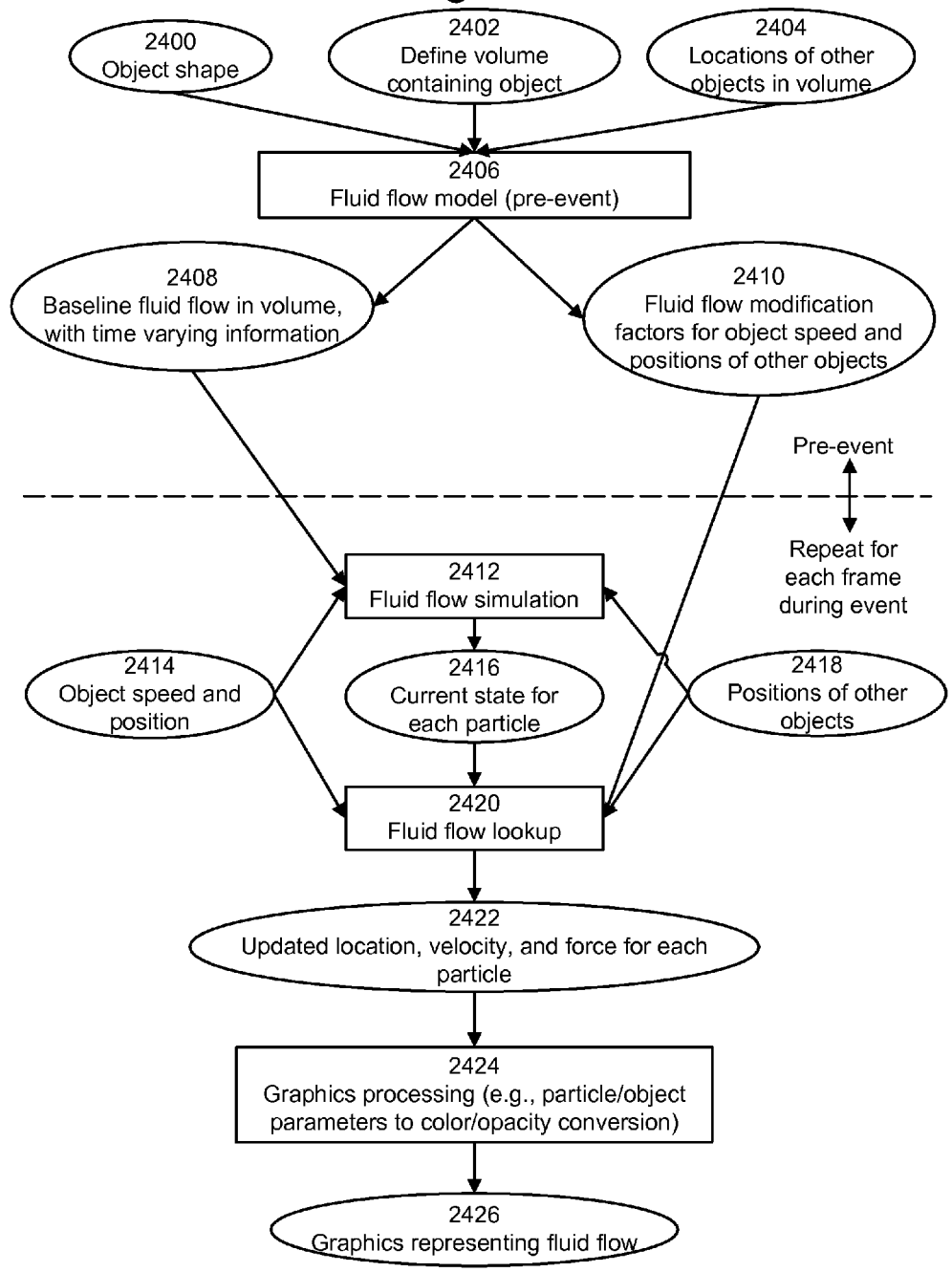

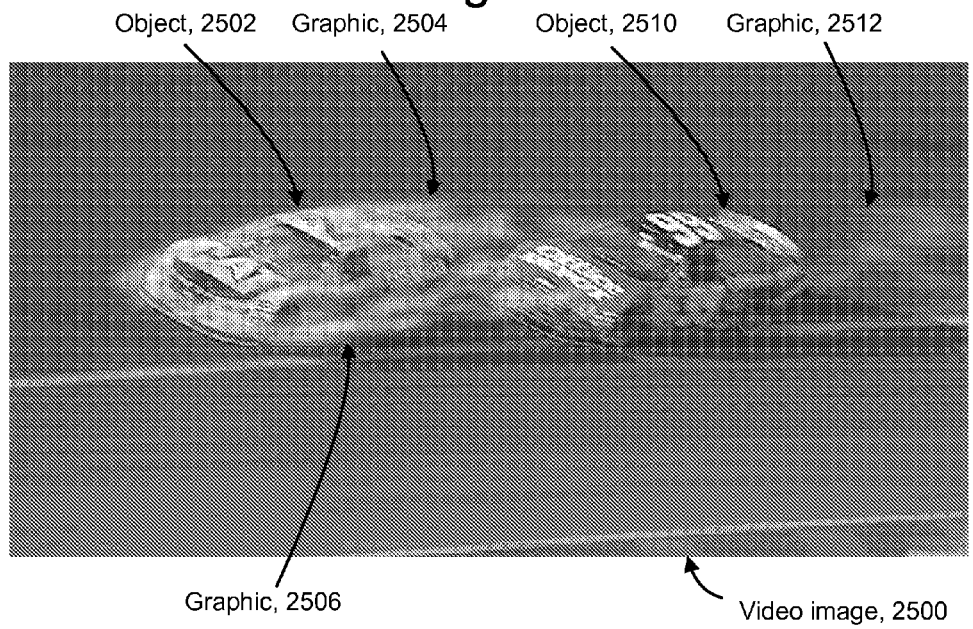
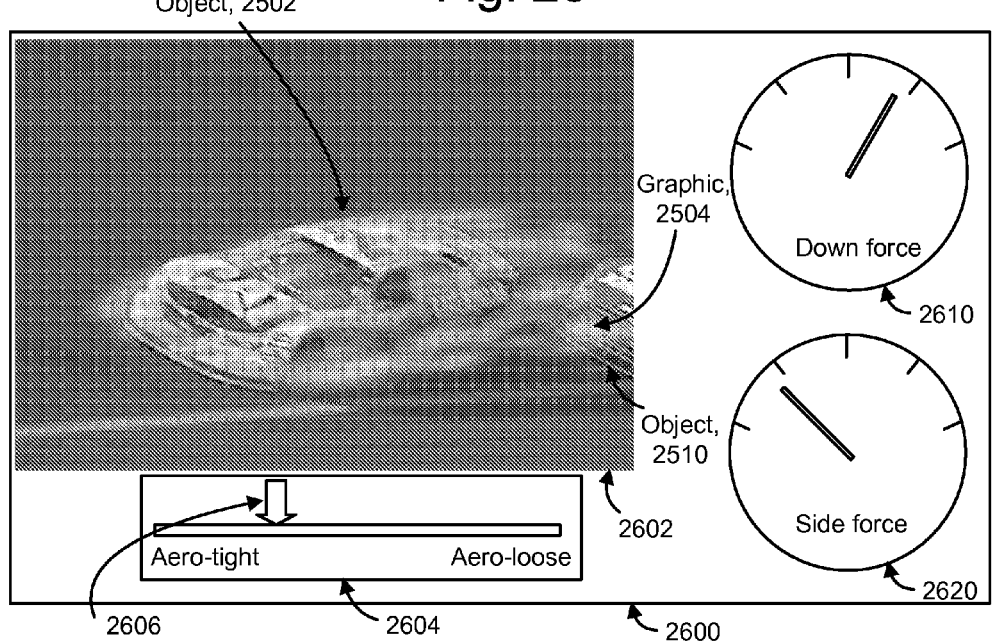

DETECTING AN OBJECT IN AN IMAGE USING EDGE DETECTION AND MORPHOLOGICAL PROCESSING

CROSS-REFERENCE TO RELATED APPLICATIONS

This application claims the benefit of U.S. provisional patent app. No. 60/952,519, titled "Providing Virtual Inserts Using Image Tracking With Camera and Position Sensor," filed Jul. 27, 2007, incorporated herein by reference.

This application is related to the following commonly assigned, co-pending applications filed herewith, each of which is incorporated herein by reference:

U.S. patent application Ser. No. 11/960,586 filed Dec. 19, 2007, published as US 2009/0028439 on Jan. 29, 2009 and issued as U.S. Pat. No. 8,077,981 on Dec. 13, 2011, titled "Providing Virtual Inserts Using Image Tracking With Camera And Position Sensors";

U.S. patent application Ser. No. 11/960,586 filed Dec. 19, 2007 and published as US 2009/0027494 on Jan. 29, 2009, titled "Providing Graphics In Images Depicting Aerodynamic Flows And Forces,";

U.S. patent application Ser. No. 11/960,571 filed on Dec. 19, 2007 and published as US 2009/0028440 on Jan. 29, 2009, titled "Detecting An Object In An Image Using Multiple Templates,";

U.S. patent application Ser. No. 11/960,577 filed on Dec. 19, 2007 and published as US 2009/0027500 on Jan. 29, 2009, titled "Detecting An Object In An Image Using Templates Indexed to Location or Camera Sensors,";

U.S. patent application Ser. No. 11/960,600 filed Dec. 19, 2007 published as US 2009/0027501 on Jan. 29, 2009 and issued as U.S. Pat. No. 8,253,799 on Aug. 28, 2012, titled "Detecting An Object In An Image Using Camera Registration Data Indexed To Location Or Camera Sensors,"; and U.S. patent application Ser. No. 11/960,606 filed Dec. 19, 2007 and published as US 2009/0028425 on Jan. 29, 2009, titled "Identifying An Object In An Image Using Color Profiles,".

BACKGROUND OF THE INVENTION

Various techniques have been developed for enhancing video broadcasts of live events. Broadcasts can be enhanced to assist the human viewer in following the action of the live event as well as providing entertainment and educational benefits. For example, during a sporting event such as a car race, the video can be enhanced with graphics which identify the driver of a car. Further, information such as the speed of the car can be obtained via telemetry from the car and displayed in an on-screen graphic. Some approaches use GPS to detect the location of a moving object. For example, U.S. Pat. No. 6,744,403, issued Jun. 1, 2004, titled "GPS Based Tracking System", and incorporated herein by reference, describes a technique for tracking moving objects such as race cars using GPS, other sensors and radio communications. The Global Positioning System (GPS) includes several earth-orbiting satellites having orbits which are arranged so that at any time, anywhere on Earth, there are at least four satellites visible in the sky. A GPS receiver, which can be carried by a race car, for example, or other moving object, detects the signal from four or more of these satellites to determine its own location using multi-lateration.

U.S. Pat. No. 6,657,584, issued Dec. 2, 2003, titled "Locating An Object Using GPS With Additional Data", and incorporated herein by reference, describes a fault tolerant GPS system that can rely on other types of data if fewer than four satellites are available. For example, the location of a race car on a track can be determined using a model of the track to constrain a GPS based determination of position to a surface of the track.

However, when enhancing the video, various inaccuracies can arise. For example, it can be problematic to identify a particular object in a video frame due to camera registration inaccuracies, the presence of other similar objects in the frame and other factors. As a result, graphics and other enhancement may not be correctly positioned. Further, graphics which depicts aerodynamic flows and forces on an object have not been available in broadcasts of live events.

SUMMARY OF THE INVENTION

The present invention addresses the above and other issues by providing a system and method for processing image data of a live event.

Techniques for enhancing a video broadcast of a live event are provided. One technique involves detecting a moving object in the event from a video image. A representation of the object can be detected using a template of the object. The template can be a pixel template, an edge detected and morphologically processed template, or a color profile template, among others. Combinations of different types of templates may be used as well. The representation of the object in the image can be based on data indicating an orientation of the object, a shape of the object, an estimated size of the representation of the object in the image, and the estimated position of the object in the image. Camera registration and/or sensor data can be updated based on a position of the detected representation for use in detecting a representation of the object in a subsequent image. Graphics can also be provided based on aerodynamic flows and forces.

In one embodiment, a method for processing image data includes obtaining an image of a live event which is captured by at least one camera, where the live event includes an object, performing first edge detection to detect first edges which extend in a first direction in the image, and performing second edge detection to detect second edges which extend in a second direction in the image. The method further includes detecting which of the second edges are near the first edges, and performing morphological processing on the first edges and the second edges which are near the first edges to obtain a representation of the object.

In another embodiment, a system for processing image data includes at least one camera for capturing an image of a live event, where the live event includes an object, and at least one processing facility which receives the image. The at least one processing facility: a) performs first edge detection to detect first edges which extend in a first direction in the image, b) performs second edge detection to detect second edges which extend in a second direction in the image, c) detects which of the second edges are near the first edges, and d) performs morphological processing on the first edges and the second edges which are near the first edges to obtain a representation of the object.

In another embodiment, a method for processing image data includes obtaining an image of a live event which is captured by at least one camera, where the live event includes an object, determining a direction of motion of the object in the image, detecting first edges in the image which extend perpendicular to the direction of motion, and detecting second edges in the image which extend parallel to the direction of motion. The method further includes dilating the first edges to provide dilated first edges, identifying which of the second edges intersect with the dilated first edges, and performing morphological processing on the first edges and the second edges which intersect with the dilated first edges to obtain a representation of the object.

Corresponding methods, systems and processor readable storage devices are provided.

BRIEF DESCRIPTION OF THE DRAWINGS

FIG. 8 depicts a video image showing objects and mesh models which are offset from one another.

FIG. 9a depicts the video image of FIG. 8 after correcting the offset.

FIG. 10 depicts a video image showing objects and textured models which are offset from one another.

FIG. 11 depicts the video image of FIG. 10 after correcting the offset.

FIG. 14a depicts a process for detecting a representation of an object in an image using a template.

FIG. 14b depicts a process for updating camera registration and/or sensor data.

FIG. 14c depicts a process for updating location data.

FIG. 16 depicts a process for detecting a representation of an object in an image via edge and morphology based template matching.

FIG. 18 depicts a process for detecting a representation of an object in an image using multiple templates.

FIG. 19 depicts a process for detecting a representation of an object in an image using templates indexed to location and/or camera sensor data.

FIG. 20 depicts a process for storing camera registration-related data indexed to location and/or camera sensor data.

FIG. 21 depicts a process for determining a search area for detecting a representation of an object in an image using camera registration-related data indexed to location and/or camera sensor data.

FIG. 24a depicts an overview of a system for providing fluid flow data.

FIG. 25 depicts an image showing fluid flow graphics.

FIG. 26 depicts an image having a graphic which depicts fluid flow forces.

DETAILED DESCRIPTION

The present invention provides a system and method for processing image data of a live event.

Figure 1:
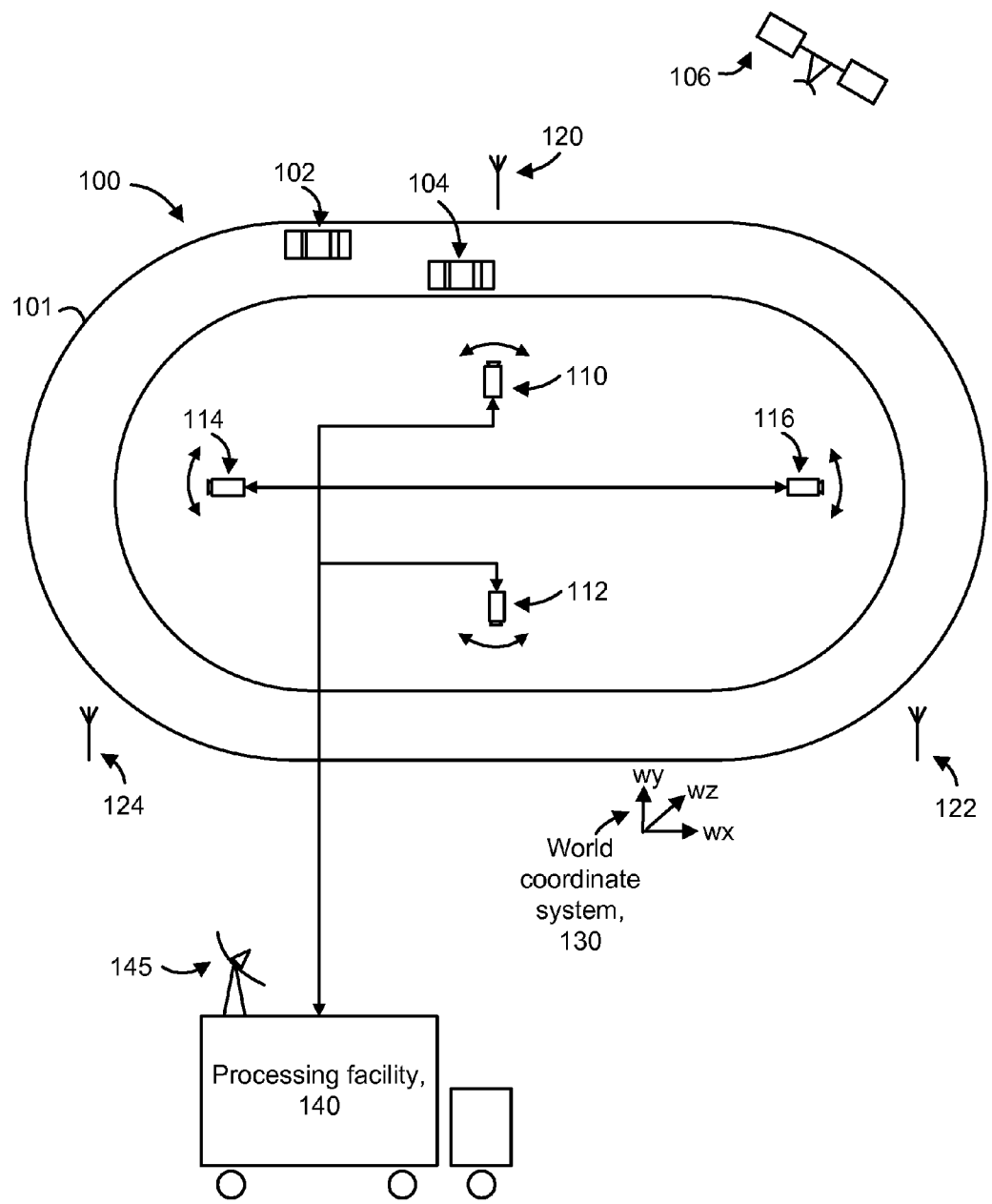
FIG. 1 depicts a live event in which objects are tracked by cameras.

FIG. 1 depicts a live event in which objects are tracked by cameras and GPS receivers. In one example application, objects such as a race cars 102 and 104 traverse a course at an event facility 100 such as a race track. It will be appreciated that many other applications are possible. For example, vehicles other than race cars may be involved. Or, the objects may be humans or animals. The object can be a ball or other game object in a sporting event. Further, the objects may travel on the ground, on water, under water or in the air. The event facility 100 includes a race course or track 101 on which the objects 102 and 104 travel. Two objects are depicted as an example only, as one or more objects may be present. Further, the object may be stationary or moving. One or more cameras are positioned to capture images of the object. For example, cameras 110, 112, 114 and 116 are located at different positions along the course. The cameras can follow the objects as they travel along the course. The arrangement of cameras shown is an example only. Other views, including overhead views, views from the grandstands and so forth can also be provided. Moving and on-board cameras can also be used.

The cameras 110, 112, 114 and 116 can be television broadcast cameras, for instance, which capture thirty frames or sixty fields per second, in one possible approach. In an example implementation, HD-SDI 720p video uses 60 frames/sec. While such cameras sense visible light, it is also possible to use cameras that sense electromagnetic radiation outside a range of visible light, such as infrared radiation, depending on the application. Further, note that other rates of image capture can be used. The location of the objects can be described in terms of a world coordinate system 130, also known as a free space coordinate system, which is fixed relative to the earth or other environment of interest, in one approach. The world coordinate system 130 includes orthogonal directions represented by a wy axis, a wx axis, and a wz axis which extends out of the page. An origin of the world coordinate system can be chosen to be at a specified location relative to the event facility 100. Or, the origin can be miles away from the event. Other world coordinate systems whose axes are not orthogonal are also possible, including for example coordinate systems which use latitude, longitude and elevation, spherical coordinate systems and so forth.

Each camera can be provided with sensors which detect intrinsic and extrinsic parameters of the camera when these parameters are variable. Intrinsic parameters, such as focal length, lens distortion and zoom setting represent characteristics of the camera design and settings, and do not depend on the position and orientation of the camera in space. Extrinsic parameters, such as tilt or pan, depend on the position and orientation of the camera in space. Such sensors can be provided using techniques known to those skilled in the art. For example, pan and tilt sensors can be attached to a tripod on which the camera is mounted. See, e.g., U.S. Pat. No. 5,912, 700, issued Jun. 15, 1999, incorporated herein by reference. The sensors can be used to determine the field of view of the camera, e.g., where the camera is pointing and what it can see.

It is also possible to determine camera extrinsic and intrinsic parameters without sensors, e.g., as described in Tsai's method. See, e.g., Tsai, Roger Y. (1986) "An Efficient and Accurate Camera Calibration Technique for 3D Machine Vision," Proc. of IEEE Conf. on Computer Vision and Pattern Recognition, Miami Beach, Fla., 1986, pp. 364-374. For example, one approach to determine the intrinsic and extrinsic parameters of a camera involves placing marks in various measured or known locations in the event facility such that each mark looks different and at least one mark will always be visible to the camera while the camera is pointed at the event facility. The marks could look identical and be distinguished through other means such as arrangement or triggering/flashing. A computer using optical recognition technology can find the mark in the video frame and, based on the mark's size and position in the video frame, determine the camera parameters. Another approach to determining intrinsic and extrinsic parameters of a camera involves placing marks in various measured or known locations in the event facility such that each mark looks different, but the marks may be removed after camera parameters have been determined. A computer implementing a camera parameter estimation algorithm based on manual user interaction rather than, or in addition to, pattern recognition can determine camera parameters.

The cameras capture images of the objects and communicate the images in analog or digital signals by wire or other link to a processing facility 140, which can be a mobile facility parked at or near the event facility 100, in one possible approach. The processing facility 140 includes equipment which receives and stores the captured images, and processes the captured images, such as to add graphics to the images. In particular, when the captured images are provided in video signals from the cameras, the processing facility 140 can enhance the video signals based at least in part on the determined position of the object. Example enhancements include a graphic which provides an identifier for the object, such as an identifier of the driver of the car, an advertisement or other logo which is overlaid on the object, a graphic which depicts air or other fluid flow over the object and a graphic which depicts aerodynamic or other forces on the object. The processing facility 140 can subsequently transmit the enhanced video, via an antenna 145 or optical fiber, etc., to another location such as a television broadcast facility for broadcast to viewers in their homes. In another approach, the processing facility can be remote from the event facility 100. Enhancement of the images could also be performed in a studio or even at the viewer's home, e.g., via a set top box.

Although examples are provided which involve broadcasts of television signals, images can similarly be communicated to end users via a network such as the Internet, or a cell phone network, to computing devices such desktop computers, laptops, cell phones with image rendering capabilities, portable digital assistants and the like. In one approach, the images are streamed to a computing device. The images can similarly be downloaded as one or more files from a server. It is also possible to transmit the enhancement (or data to compute the enhancement) via a separate mechanism or channel from that which transmits the video "program".

As mentioned at the outset, various approaches can be used to determine the position of an object. Some approaches use GPS to detect the location of a moving object, e.g., as described in above-mentioned U.S. Pat. No. 6,744,403. A GPS satellite 106 is depicted in FIG. 1 as an example. A GPS receiver which is carried on board the object (see also FIG. 29) receives the GPS signals and determines the receiver's position. The receiver's position can then be relayed to the processing facility 140 or other location via a wireless radio (RF) signal. Typically, a GPS antenna for an object such as a car is carried on the roof of the car. It is also possible for an object to use multiple GPS antennas, which can enable the determination or object orientation as well. GPS can provide a location accuracy to within about 2 cm in ideal situations. The accuracy can be affected, e.g., due to weather conditions, obstructions in the line of sight from the receiver to a satellite, such as buildings or hills, service problems with a satellite and so forth. As an alternative to GPS, or as an additional approach, the object can carry a receiver which receives radio signals from local ground based antennas, e.g., antennas 120, 122 and 124. The receiver can then determine its location through multi-angulation and/or multi-lateration, signal strength, carrier phase, and so forth. One form of multi-angulation is triangulation, and one form of multi-lateration is trilateration. The object can also communicate its position via telemetry to the processing facility 140 or other location.

In yet another approach, the position of the object can be extrapolated and/or interpolated based on the expected behavior of the object. For example, assuming the object is a vehicle traveling on repeated circuits of a race course, every time the car crosses the start/finish line or other predetermined location, a signal can be generated from a timing and scoring system. For example, the signal can be generated using technology which is similar to the loops that are used in a road to control a traffic signal by indicating that a car is at an intersection. Such technology is available from AMB i.t. of Haarlem, The Netherlands. If the typical speed that a car moves at is known, or the number of rotations of the wheels of the car can be tracked and converted to distance, the position of the car can be extrapolated by measuring the time period from the last loop crossing. This could also be done using IMU data. Thus, the object's location can be determined based on a time and/or distance since the object passed a known location in the live event. In another approach, the car transmits a radio or other electromagnetic signal which is detected by sensors around the race course. The position of the car at a given time can therefore be determined based on when the sensors detect the signal, of where they resolve the signals in their field of view, carrier phase or the like. In another approach, an optical signal is used to determine a location of the object. The time/distance unit 2988 of FIG. 29 can be used to provide time and/or distance data as discussed herein.

Figure 2:
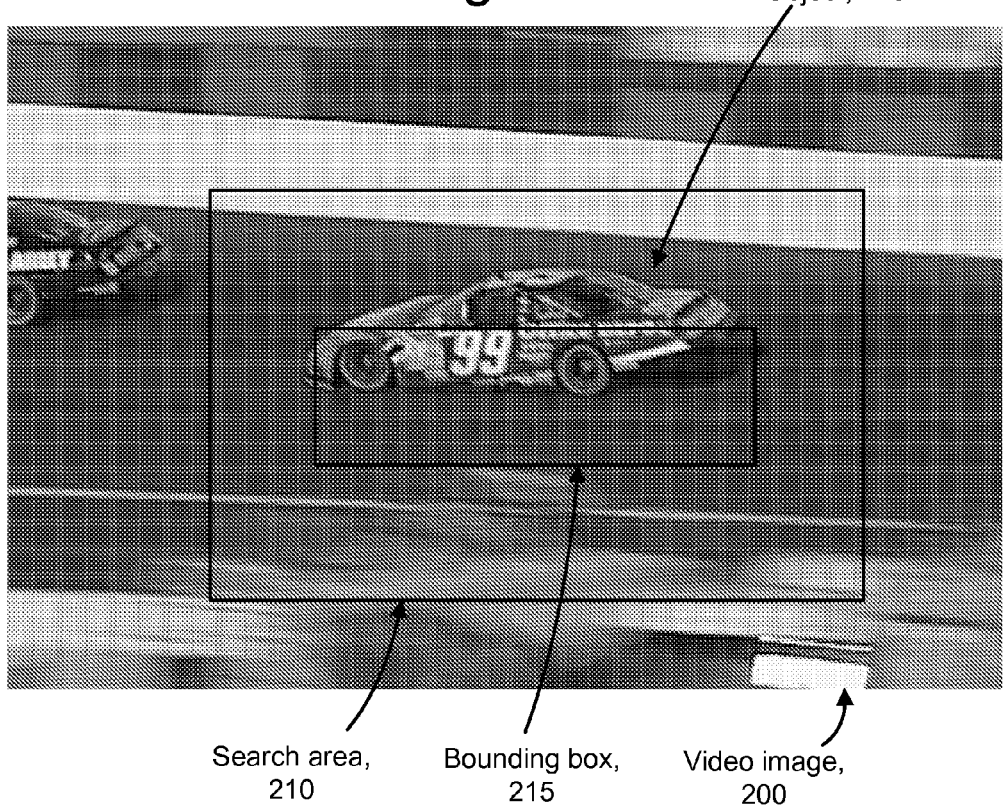
FIG. 2 depicts a video image which includes a race car as a tracked object.

FIG. 2 depicts a video image which includes a race car as a tracked object. The video image 200 includes a race car object 220 and a portion of another race car. Generally a video image can include one or more objects. A single object can be detected among other objects in an image if a sufficient portion of the object is visible. This will vary in different situations. Further, factors such as lighting, visibility, e.g., due to rain or dust, object speed, camera resolution, how fast the camera is panning, and the like will also impact the ability to detect a given object. A search area 210 is also depicted in the video image 200. As described further below, various techniques can be used to determine an appropriate search area for identifying an object in an image. In one approach, an estimate of the position of the object in the race or other live event, along with knowledge of the camera's pose, can be used to determine an estimated position of the object in the corresponding image. In particular, a bounding box 215 can be defined which has a size in pixel space which bounds an estimated size of a representation of the object in the image. The search area 210 extends a specified number of pixels around the bounding box, e.g., above, below, to the right and to the left. In one approach, the search area is centered on the bounding box. Factors such as the direction of motion of the object, camera sensor data, e.g., pan, tilt and zoom, the aspect ratio of the image and knowledge of location system inaccuracies, can also be used to set the size, shape and location of the search area.

It can be seen that the bounding box 215 does not exactly bound the representation of the object 220, but is offset. This offset can be caused, e.g., by inaccuracies in the camera registration and/or sensor data, and/or inaccuracies in the location data which indicates a location of the object in the live event. As described further below, the position and size of the bounding box 215 is based on an orientation of the object and a transformation function which transforms the object, with its given orientation, from the world coordinates of the live event to pixel coordinates of the video image. The transformation, in turn, uses both camera registration data and camera sensor data. The transformation can include both distortion correction and a projective transformation, which are non-linear. A transformation function is considered to encompass use of a transformation matrix, which is used for linear transformations, while a transformation function is considered to encompass non-linear operations as well. Registration data generally refers to the calibration of the camera sensors and some physical properties of the camera. For example, registration data can include pan offset, tilt offset, zoom field of view map, camera position (x,y,z), lens distortion and focus. These parameters are normally measured once per installation. Although, in one implementation, focus readings are taken thirty times per second. Camera sensor data can include time varying pan, tilt, zoom, and focus data. These data are all subject to inaccuracies. For example, a camera may be registered to a high degree of accuracy, but wind, vibration or other conditions can cause movement of the camera directly or via a platform on which it is mounted.

As a result of the above-mentioned error sources, the accuracy with which the position of the object in the image can be determined is reduced. For applications which rely on identification of an object in an image and insertion of graphics based on a position of the object in the image, e.g., in real time, during the broadcast of a live event, for instance, processing delays and inaccuracies can be problematic. Techniques are provided herein to increase the accuracy with which the position of an object in an image is calculated. Predetermined colors and/or patterns may be used to identify an object as well as to uniquely distinguish one object from an otherwise similar object.

Figure 3:
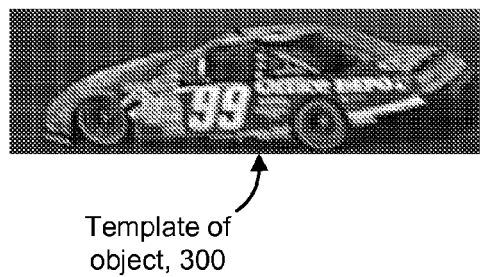
FIG. 3 depicts a portion of the video image of FIG. 2 as a pixel template.

FIG. 3 depicts a portion of the video image of FIG. 2 as a pixel template. The template can be static or can include a number of still frames which are not from video or a number of video frames. Once the object is detected in the image, the pixel data which represents the object can be stored as a template 300 for use in detecting the object in a subsequent image. In one approach, the template is a rectangular portion of the image which includes the object. The template can be approximately the same size as the bounding box. The template can be large enough to encompass the outer boundaries of the entire object, in one approach, or the outer boundaries of a significant portion of the object, for instance. Alternatively, the template need not be rectangular but can conform to the shape of the object, for instance. The template can be determined automatically from the detected position of an object in an image by selecting a predetermined number of pixels to the left, right, above and below the position, or according to some other pattern which is defined relative to the position of the object.

Figure 4:
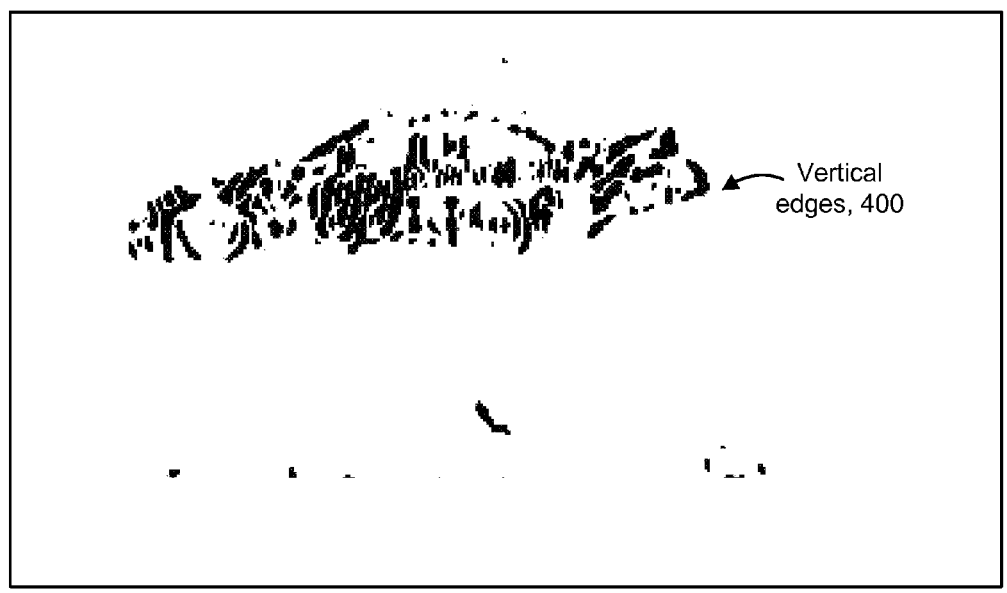
FIG. 4 depicts an image showing vertical edges of the object of FIG. 2.

FIG. 4 depicts an image showing vertical edges of the object of FIG. 2. Pattern recognition techniques include edge detection, which involves detecting edges of objects in an image. The edges can be detected based on contrasts in pixel data which extend generally vertically in an image or otherwise along a specific direction. Edge detection can be performed using, luminance and/or chrominance pixel data from an image. The chrominance pixel data can encompass any desired color space, including monochrome, RGB, YUV and HSV, among others, for instance. These edges need not represent physical features of the object, but may represent "edgtes" within patterns painted on the object, for example.

Generally, edge detection can be performed relative to any given orientation in an image. For example, edge detection may occur relative to a direction of motion of an object, e.g., parallel and/or perpendicular to the direction. In video images of a car race, for instance, the direction of motion is typically horizontal across the frames as many camera shots involve panning. It is noted that while the cars generally move horizontally, their images can move at any angle, including vertically, within a video frame. The direction of motion of an object can be assumed based on knowledge of the camera's position and movements and the path of the object being tracked. Or, the direction of motion can be determined based on sensor data of the camera, e.g., indicating pan, tilt and zoom. As an example, the panning direction of the camera can indicate the direction of motion. A camera can be instrumented with sensors which detect such information. Or, the direction of motion can be determined based on position differentials, e.g., the change in the position of an object over time. In another approach, the change in the location of an object as measured by, e.g., a GPS receiver on board the object, along with camera parameters, can be used to determine the direction of motion.

Often a camera will follow the moving object as it moves past a fixed background. Performing edge detection in a direction which is perpendicular to the direction of motion in the image can be advantageous in distinguishing edges of a moving object because the background objects will have motion blur perpendicular to the direction of motion. The blurred edges of the perpendicular background objects will not have a sharp edge. It is difficult to distinguish edges of the moving object from the edges in the background objects which are parallel to the direction of motion because the background object edges are not blurred and are thus indistinguishable from the edges of the desired moving object. The background objects can include the race track surface, walls, grandstands, poles, building and so forth. The bottom portion of FIG. 2 depicts an example of motion blur caused by stationary objects in the foreground.

The video images can be processed at the processing facility 140 by analyzing the pixel data in each image. This processing can occur in real time as each image is received. Real time processing can include, e.g., processing that occurs during a video broadcast of a live event. The image of FIG. 4 represents detected vertical edges 400. Note that the images of FIGS. 4-7 need not actually be rendered on screen but are provided to indicate how the original image is processed. The data which is represented by the images can exist solely in memory. As can be seen, most of the detected edges are part of the object, e.g., the car, while some stray vertical edges are detected as well.

Figure 5:
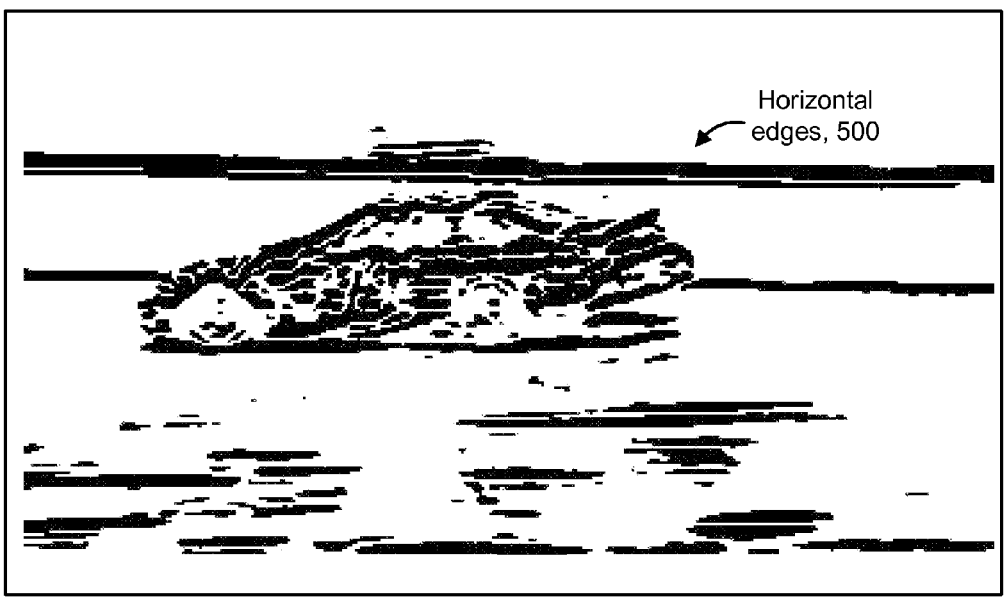
FIG. 5 depicts an image showing horizontal edges of the object of FIG. 2.

FIG. 5 depicts an image showing horizontal edges of the object of FIG. 2. Horizontal edge detection can be performed in additional to vertical edge detection. Or, as mentioned, edge detection which is parallel to the direction of motion can be performed in addition to edge detection which is perpendicular to the direction of motion. As discussed, motion blur results in edges of the object and edges outside the object being detected parallel to the direction of motion. The blur occurs in the primary direction of motion, but it mostly affects edges that are perpendicular to that direction. As before, the video images can be processed at the processing facility 140 by analyzing the pixel data in each image. This processing can occur in real time as each image is received. The image of FIG. 5 represents horizontal edge components 500. Here, the detected edges include edges which are part of the object, e.g., the car, as well as many stray horizontal edges which are part of the background and/or foreground environment of the object.

Figure 6:
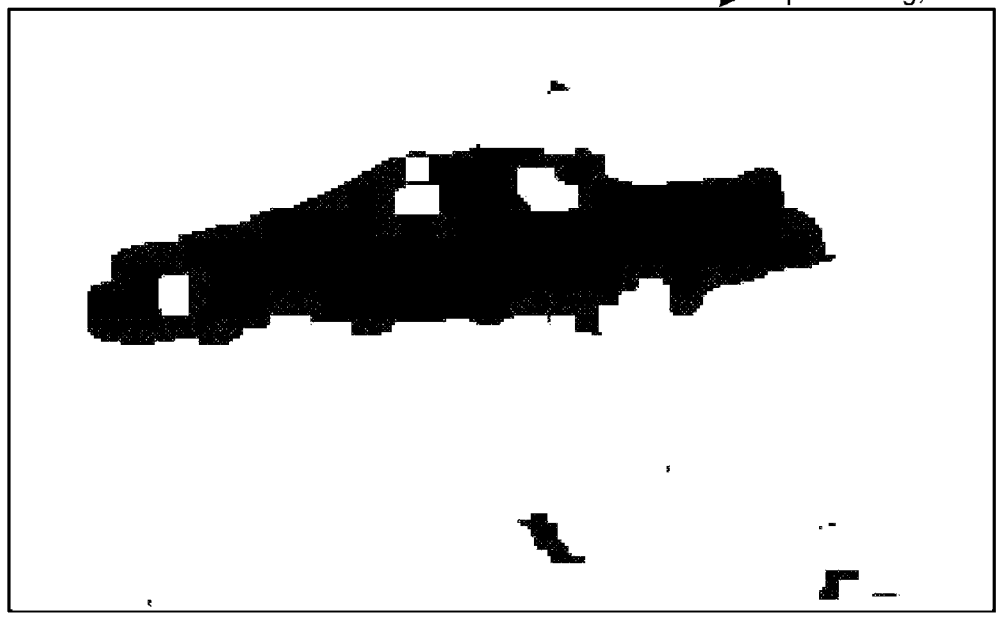
FIG. 6 depicts an image formed by combining horizontal edges of FIG. 5 which are near the vertical edges of FIG. 4, and performing morphological processing on the combined image.

FIG. 6 depicts an image formed by combining horizontal edges of FIG. 5 which are near the vertical edges of FIG. 4, and performing morphological processing on the combined image. Morphological processing is one image processing technique which can be used to detect a representation of an object in an image. In one possible approach, the image data of the vertical and horizontal edges is represented as a binary image, in which each pixel is restricted to a value of either 0 or 1. Each pixel in the background is displayed as white, while each pixel in the object is displayed as black. Binary images can be formed, e.g., by thresholding a grayscale image such that pixels with a value greater than a threshold are set to 1, while pixels with a value below the threshold are set to 0. The image data can be processed using two basic morphological operations, namely dilation and erosion. Further, one could repeat this process for different color components of the object. And of course it is not necessary that each pixel be restricted to a value of 0 or 1, or that it even be monochrome in nature.

With erosion, every object pixel that is touching a background pixel is changed into a background pixel. With dilation, every background pixel that is touching an object pixel is changed into an object pixel. Erosion makes an object smaller, and can break a single object into multiple objects. Dilation makes an object larger, and can merge multiple objects into one. Opening is defined as an erosion followed by a dilation. Closing is the opposite operation and is defined as a dilation followed by an erosion. Opening tends to removes small islands and thin filaments of object pixels, while closing tends to removes islands and thin filaments of background pixels.

In one approach, first edges. e.g., vertical edges or edges which are perpendicular to the direction of motion, are dilated and second edges, e.g., horizontal edges or edges which are parallel to the direction of motion, and which intersect the dilated first edges, are selected. The second edges which do not intersect the dilated first edges are discarded. Or, the second edges which are near the dilated first edges, e.g., a specified number of pixels away, can also be selected. Additional morphological processing can be performed to obtain data which is depicted by the image 600. This depiction provides a rough outline of the object, or features of the object, in addition to some noise.

Although morphological processing is discussed as an example, many image processing techniques can be used to detect the representation of an object in an image.

Figure 7:
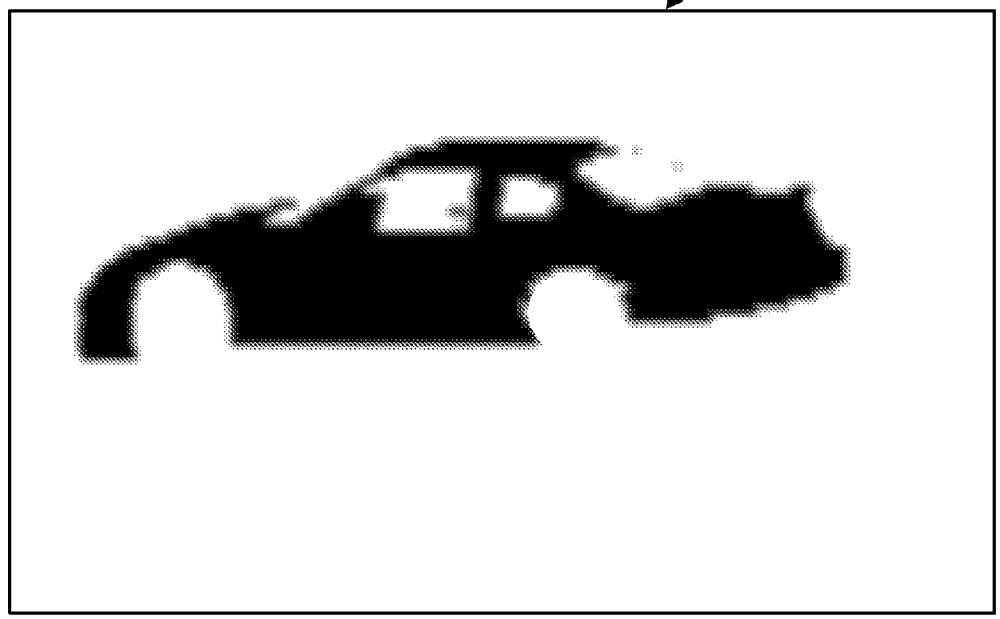
FIG. 7 depicts a template formed by a model of the object.

FIG. 7 depicts a template formed by a model of the object. The template is also formed using knowledge of its orientation and location, as well as knowledge of the camera pose at the time the image is taken. The image of FIG. 6 can be processed by comparing it to a template of the object. In particular, a template 700 can be provided based on a shape and orientation of the object, in addition to an estimated size of the representation of the object in the image. For example, the object can be a car with a known shape which is modeled as a 3d mathematical model. See also FIG. 8, which depicts mesh models 802 and 812 of cars. The orientation of the object can be determined based on an inertial measurement unit (IMU) carried on board the object. The IMU can include gyroscopes which provide heading, pitch and/or roll information. Heading can also be determined using position differentials at different times. For example, if an object is in position P1(x1,y1,z1) at time t1 and in position P2(x2,y2,z2) at time t2, the heading at a tune which is halfway between t1 and t2 can be computed as the vector P2-P1. Or, a model of the track that the object is traversing can be used to determine the orientation. The roll orientation, for example, can be computed based on a track normal at the location of the object. For example, location data of the object in the live event can indicate where the object is relative to the track. It can then be assumed that the object has a particular orientation based on that location, e.g., the object has a heading which is in the direction of the track at the location, has a roll angle which is the bank angle of the track at the location, and has a pitch angle which is the pitch of the track at the location. Alternatively, this information may be used with information from other source to determine the object's orientation. It is also possible to perform rotating, skewing, and scaling captured templates to match the object in its predicted location and orientation.

The estimated size of the representation of the object in the image can be determined based on, e.g., sensor data of the camera, such as a zoom setting of the camera, and a known distance from the camera to the object. In one approach, the distance from a fixed camera position to the object can be calculated for different locations of the track, and location data of the object can be used to determine the distance. In another approach, the camera and object both include location-detecting devices such as GPS receivers, and the distance between the camera and the object is based on a difference between their relative locations.

The template 700 is compared to the image 600 at each (sx, sy) pixel location in the search area. See also FIG. 12 regarding coordinates in pixel space. In one approach, the image 600 and template 700 are both binary images. A cross-correlation between the image and template can be determined for each relation between template and image. This may include scale, rotation, skewing, distorting either the template, the image or both. The position of an optimum representation of the object in the image can be determined based on the closest correlation, or a combination of correlation and expected location/orientation of the object based on other matching methods, vehicle and camera behavior, vehicle location system, etc.

In another object detecting technique, the video template 300 of FIG. 3 can be correlated with each different location in the search area 210 of FIG. 2 to determine the position of an optimum representation of the object in the image based on the closest correlation. Again, we can not only translate, but also rotate, skew, scale, distort, etc. Furthermore, we don't necessarily have to limit the number of possible positions to discrete pixel positions. Finally, we can achieve sub-pixel accuracy in several ways. The video template may be obtained, e.g., using edge and morphology based template matching, as described previously. The correlation can be made using luminance and/or chrominance data (in any color space). Further, multiple correlations can be made, each using a different color space or different color components, and the results combined.

Generally, multiple detecting techniques can be used and the results can be merged or compared to obtain a final result regarding the position of an object in an image. This would typically be done to make the most of each technique's strengths while avoiding each technique's weaknesses. For example one technique might be extremely accurate, but a poor discriminator of matches to the wrong object, while another technique may be less accurate while providing good discrimination.

For example, comparison of the morphological image 600 to a template of a model of the object 700, as depicted in FIGS. 6 and 7, respectively, can be performed to obtain a first determination of a position of the object in the image, and comparison of the pixel data of a video template 300 to video data 200 of the object, as depicted in FIGS. 2 and 3, can be performed to obtain a second determination of a position of the object in the image. In some cases, the determined positions may differ. One approach is to determine a final position which is between the determined positions. For example, assume first and second object detection techniques result in image position (sx1, sy1) and (sx2, sy2), respectively. A final object position in pixel space is then (0.5·(sx1+sx2), 0.5·(sy1+sy2)). Moreover, weights can be assigned to the respective positions so that one position is accorded a greater weight if it is obtained by a technique that is deemed more reliable, for instance. In the above example, if weights of 0.25 and 0.75 are assigned to the first and second object detection techniques, respectively, a final object position is (0.25·sx1+0.75·sx2, 0.25·sy1+0.75·sy2). Note that the object position can be defined at the center of the object or at another reference location on the object.

One might use one technique to determine which local maximum to use of the other technique, and use that second technique to determine the final position of the object. When three or more technique are employed, voting schemes also offer certain advantages.

Another possible weighting scheme is as follows. In a first step, detect the screen position (sx, sy) based on video template matching or other first type of template matching. In a second step, detect the following set of possible screen positions based on edge/morphology based template matching or other second type of template matching: (sx1, sy1), (sx2, sy2), (sx3, sy3) . . . . Each one of these screen positions was detected with a certain correlation, e.g., c1, c2, c3 . . . . In a third step, among the positions detected in the second step, pick the one that is close to the position detected in the first step and at the same time has a good correlation (e.g., a correlation which exceeds a threshold). The following weighting function may be used to achieve this: w1*correlation+w2*(1-dist/maxdist), where dist is the Euclidean distance between a position detected in the second step and the position detected in the first step, maxdist is the maximum of such distances computed. Also, w1 and w2 are weights, e.g., where w1+w2=1. This third step would be repeated for every position detected in the second step, and the one that gets the highest score according to the above formula will get picked as the final result for the position of the representation of the object in the image.

In another approach, multiple detections can be performed using a given technique and an average, mean or other statistical metric used to determine the final position. A statistical metric based on detections using multiple techniques can also be used. Positions which are outliers can be omitted using signal processing techniques. Generally, signal processing techniques can be used to remove noise and random errors, and to omit results which are inconsistent with physical constraints of the object, environment of the object, such as a race track, and/or the at least one camera. As an example, if the following are the (sx, sy) image positions detected for an object in a sequence of consecutive frames: (100,150), (110, 152), (210,154), (130,156), (140,157), using signal processing we can detect and remove the position (210,154) as outlier since the change in image positions of the object corresponds to a change in the object's locations in the live event which is not physically possible for the object.

Techniques for detecting an object can be applied as well to detecting multiple objects. Tracking multiple objects in parallel can be performed, where the matching results of one object can be used to refine an initial estimate for the other objects, such as an estimate of positions of the representations of the other objects in an image. Further, the detection of one or more objects can occur repeatedly, once for each image in a series of images such as a video broadcast. The template 700 and other templates discussed herein can be generated on the fly for each tracked object.

Also, when detecting multiple objects, one might choose those candidates that imply the most similar inaccuracies as this suggests systematic inaccuracies in the positioning system and/or knowledge of camera pose.

As mentioned, due to inaccuracies in camera registration and/or object location data, the detected location of an object in an image can differ from the expected location as determined by location data from GPS or other initial estimation techniques discussed herein. Inaccuracies which can be observed are illustrated below.

FIG. 8 depicts a video image showing objects and mesh models which are offset from one another. The image includes objects 800 and 810 and models 802 and 812, respectively, which are overlaid on the image at the respective expected locations. An offset or offsets between the models and the objects is clearly seen. Note that a model or other graphic can also be provided on a new image which is derived from the original image.

FIG. 9a depicts the video image of FIG. 8 after correcting the offset. Here, the models are overlaid on the image at the detected locations of the objects in the image. As can be seen, there is a very close match between the video representations of the objects and the models of the objects. Note that the models can have a shape and appearance which is specific to the object which it models.

Figure 9B:
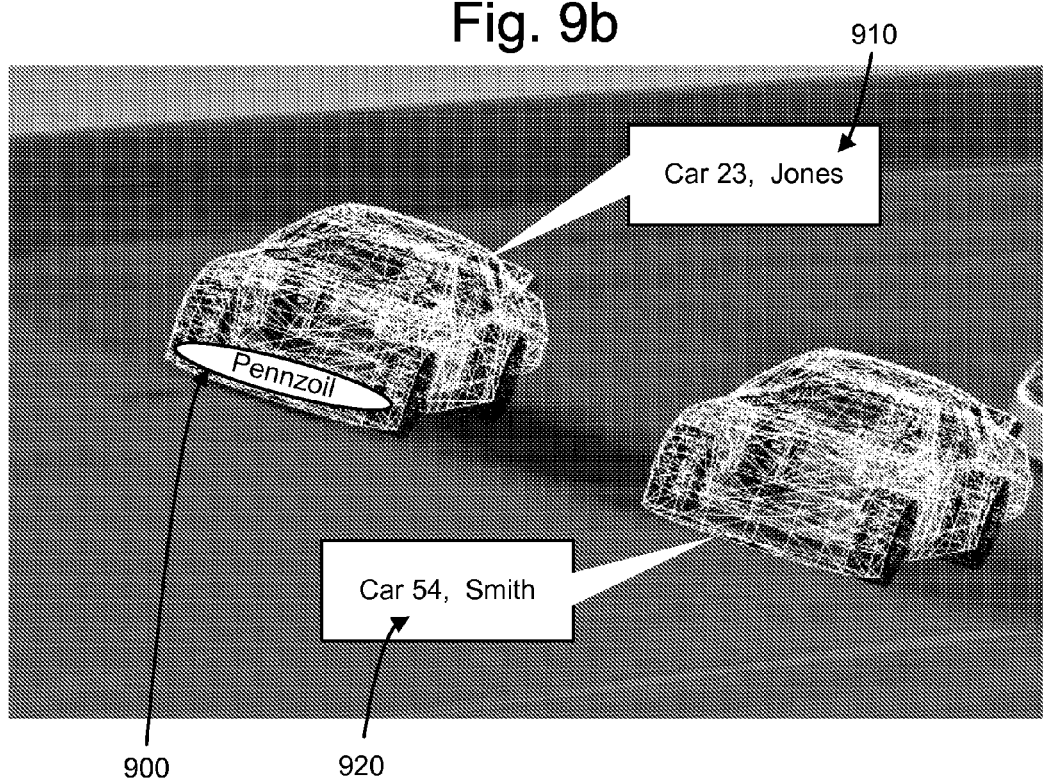
FIG. 9b depicts the video image of FIG. 9a with added graphics.

FIG. 9b depicts the video image of FIG. 9a with added graphics. With knowledge of the actual position of an object in an image, various benefits can be realized. For example, graphics can be combined with the pixel data of a video image to provide a combined image as discussed below. The graphics include a graphic 900 which is a logo or advertisement which is overlaid on the object. Note that the mesh model is also depicted for reference, but it is not necessary to display the model, as the logo or advertisement can be overlaid directly on, or otherwise combined with, the video image of the object. The model is used to define the location and appearance of the logo so that it appears more realistic, as if it is actually painted on the object, or in the case of pointers, that it accurately points to the appropriate object. If the logo was to be inserted into the image based on the location data-based position rather than the detected position, it would likely not be positioned correctly and would not appear as if it was part of the live event.

Note that pointers are intended to be accurate, but are not intended to appear as if they are a part of the live event. Also, graphics such as airflow graphics are intended to appear as if they were part of the live event, but unlike a logo, are not intended to give the illusion that they actually are part of the live event Graphics 910 and 920 identify the objects based on the car number and the driver's name. These graphic include pointers which extend to the objects in the image. Again, detecting the actual position (and scale, orientation, etc.) of the objects in the image allows these graphics to be correctly positioned. In one approach, the location data of the object includes an identifier of the object which is used in the identifying graphics 910 and 920.

Such graphics allow a television broadcast of a live event to be enhanced by providing information which allows the viewer to follow and learn about the event and can enable the broadcaster to call attention to specific objects or players the announcers/talent may wish to discuss.

FIG. 10 depicts a video image showing objects and "textured" models which are offset from one another. The texture does not necessarily imply a physical relief in this context. The models of the objects can have a texture or skin which mimics that of the real object. For example, models 1002 and 1012 mimic the appearance of real objects 1000 and 1010, respectively. FIG. 10 depicts the models when they are offset due to inaccuracies. FIG. 11 depicts the video image of FIG. 10 after correcting the offset. Information regarding the paint scheme of each object, such as cars in a race, can be combined with knowledge of the shape of each object to provide the models depicted using known modeling and rendering techniques.

Further, we can consider the average offset as a camera registration error while the relative offsets of the models 1002 and 1012 are assumed to be positional errors, for example. Also, note that the texture of the models can include color in a "pattern" sense as well as a "color content" sense.

The models with the texture applied can also be used as templates in a correlation process as discussed in connection with FIG. 18. FIG. 18 describes a combination algorithm which uses model/edge based matching and video template based matching. However, the textured model template need not necessarily be used in this combination algorithm. It can be used by itself. The model rendered with texture can be used as a template to match/correlate with the video directly.

A broadcast of a race, for instance, can be enhanced by overlaying a model of a car over the video image, e.g., to highlight a car that is leading the race or is otherwise of interest. The models can be blended in and out seamlessly to provide a continuous viewing experience. Similarly, other events can be enhanced by the addition of graphics which are located accurately with respect to objects in images, and which provide information which is specific to the objects.

Figure 12:
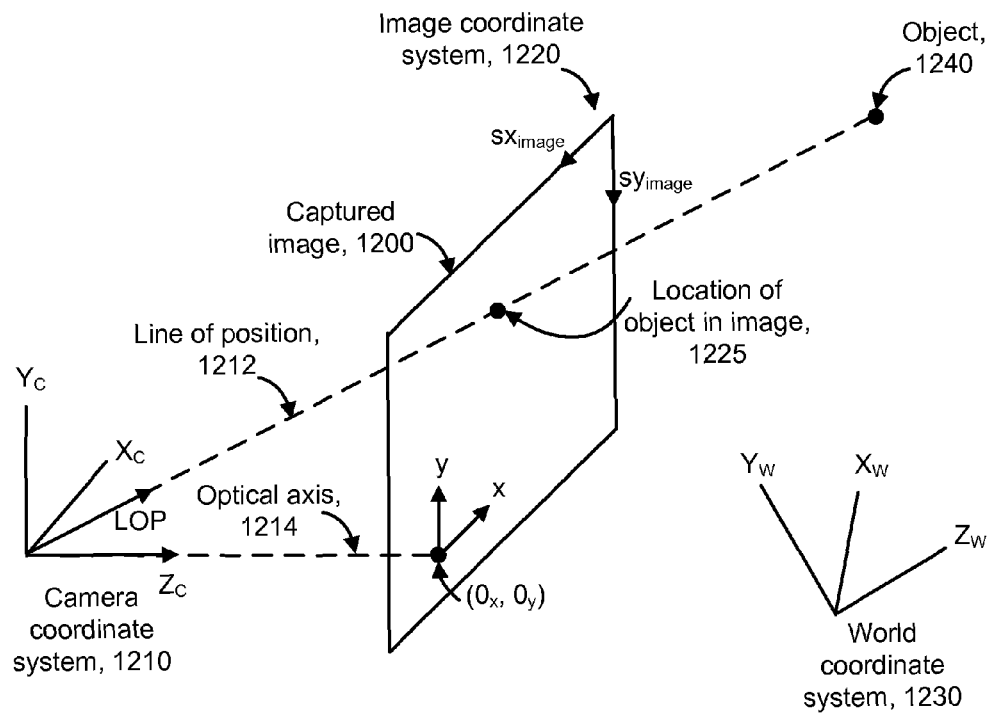
FIG. 12 depicts a relationship between camera, image and world coordinate systems.

FIG. 12 depicts a relationship between camera, image and world coordinate systems. A camera coordinate system 1210, which includes orthogonal axes $X_C$, $Y_C$ and $Z_C$ in three dimensions, is fixed relative to the camera. The origin of the coordinate system may be at the front nodal point of the lens, in one possible approach, modeling the camera as a pinhole camera. An image coordinate system 1220, also referred to as pixel space, includes orthogonal axes X and Y in two-dimensions, and is fixed relative to a captured image 1200. A world coordinate system 1230, which includes orthogonal axes $X_W$, $Y_W$ and $Z_W$, is fixed relative to e.g., the earth, the site of a live event such as a stadium, or other reference point or location. The position and/or path of the object 1240 can be determined in the world coordinate system 1230 in one possible approach, e.g. using GPS data or other approaches. The line of position 1212 is an imaginary line which extends from the camera position (which in this case is at the origin of the camera coordinate system 1210) through a pixel in the image 1200, intersecting the pixel at a point 1225, and through the object 1240. Each pixel in the image 1200 corresponds to a different line of position. Point 1225 in the captured image 1200 represents the location of the object 1240 in the image. The location of the object in the image 1200 can be represented by coordinates (sx, sy) in a coordinate system which has its origin at a corner of the image, in one approach. The coordinates may identify the center of the object.

Further, the line of position can be represented by a vector (LOP) which has unity magnitude, in one approach. The vector can be defined by two points along the LOP. The vector can be represented in the world coordinate system 1230 using an appropriate transformation from the image coordinate system.

The $Z_C$ axis of the camera coordinate system, which is the optical axis 1214 of the camera, intersects the captured image at a point represented by coordinates ($0_x$, $0_y$). A two-dimensional coordinate system extending from ($0_x$, $0_y$) can also be defined.

The camera registration process involves obtaining one or more transformation matrices or functions which provide a conversion between the image coordinate system 1220 and the world coordinate system 1230. Further information can be found in E. Trucco and A. Verri, "Introductory techniques for 3-D computer vision," chapter 6, Prentice Hall, 1998, U.S. Pat. No. 5,912,700, issued Jun. 15, 1999, and U.S. Pat. No. 6,133,946, issued Oct. 17, 2000, each of which is incorporated herein by reference.

With the above framework, a location of an object at a live event can be transformed to a position, orientation, etc. in the image, and search parameters for detecting the object can be defined based on this position. Search parameters can encompass a search area as well as other information for searching. Moreover, the detected location, orientation, scale, etc., of an object in an image can be used to correct location data and camera registration and/or sensor data as described herein.

Figure 13:
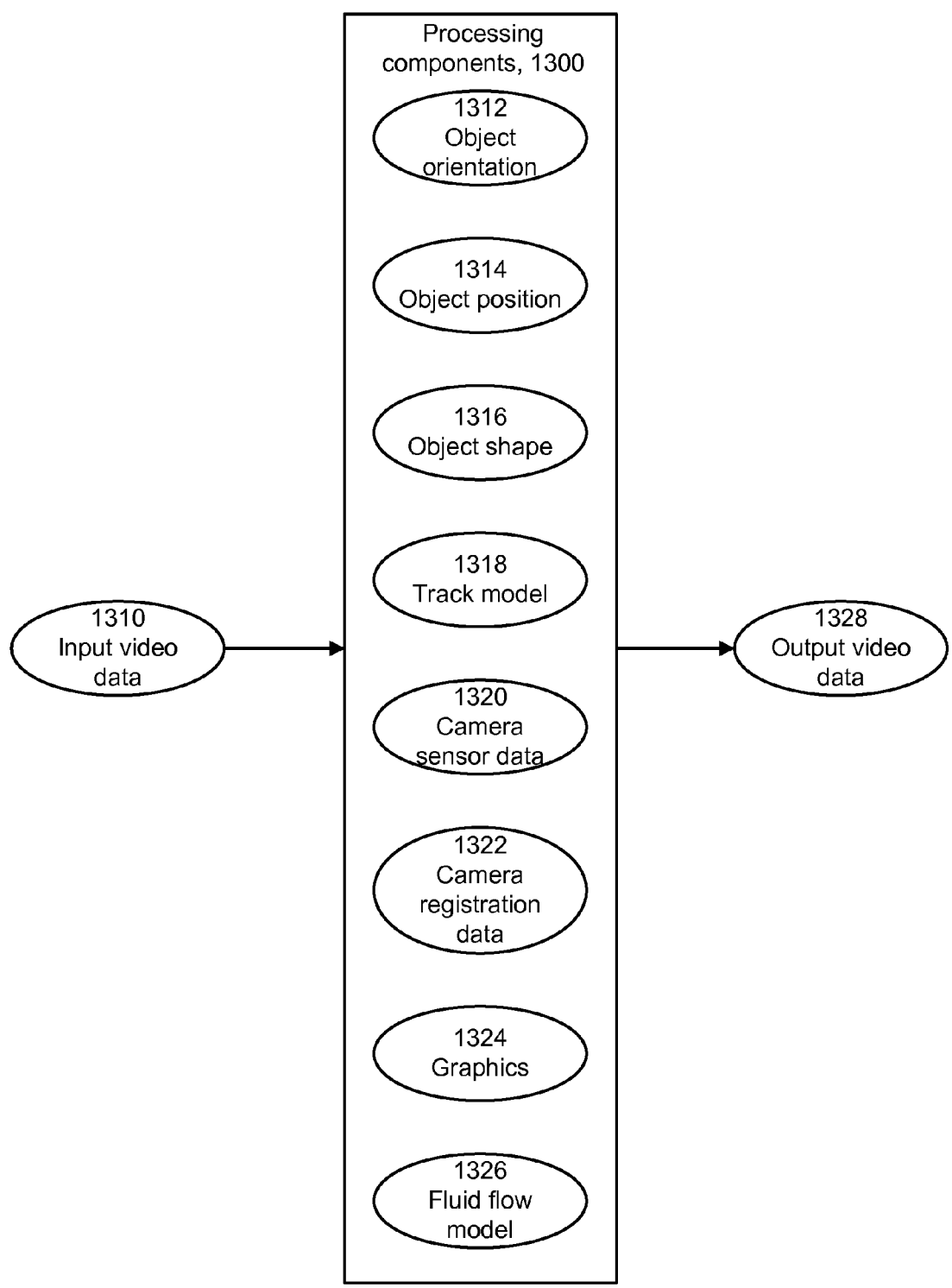
FIG. 13 depicts an overview of a system for modifying video data.

FIG. 13 depicts an overview of a system for modifying video data. The system is depicted in a conceptual overview as including a number of processing components 1300 which act on input video data 1310 to provide output video data 1328. The input video data can be obtained, e.g., from a broadcast of a live event, from delayed video of the live event, or from a replay during or after the live event. The processing components can include different types of information, including object orientation 1312, object position 1314, object shape 1316, a track model 1318 for an object which moves on a track, camera sensor data 1320, camera registration data 1322, graphics 1324 and a fluid flow model 1326. The processing components can be provided to the processing facility 140 for use in providing graphics or other enhancements in the output video data 1328. Some of the processing components are predetermined/precomputed before images of an event are obtained. These can include, e.g., object shape, track model, initial camera registration data, graphics and fluid flow model. Some of the processing components can be obtained or updated during an event, such as object orientation, object position, camera sensor data and inputs to the fluid flow model. Further information regarding the processing components is provided below. Further information regarding the fluid flow model 1326 is provided in connection with FIGS. 24-28.

FIG. 14*a* depicts a process for detecting a representation of an object in an image using a template. As mentioned previously, the position of a representation of an object in an image can be determined through correlation with a template of the object. Further, the template can include a binary image of the object which is obtained from edge and morphology based template matching (see also FIG. 16) and/or a video template which includes pixel data of the object from a prior image. Multiple detection techniques can also be used and the results combined. An example process includes, at step 1400, determining the orientation of an object such as based on an inertial measurement unit carried by the object, a track model and/or position differentials at different times, as discussed previously in connection with FIG. 1. Note that the orientation data need not be updated as quickly as a typical video frame rate as it typically does not change that quickly.

Step 1402 includes determining the location of the object in the live event, e.g., based on GPS or other location data. Step 1404 includes obtaining camera registration data. Step 1406 includes obtaining an estimated size, orientation and position of the object in the image. This can be achieved, e.g., by transforming the size, orientation and position of the object in the live event from world coordinates to image coordinates using a transformation matrix which is based on the camera registration and sensor data. Step 1408 includes determining a set of search parameters (e.g., a search area) for the object, as discussed previously in connection with FIG. 2. Step 1410 includes defining a template based on the estimated size, orientation and position (distortion, perspective, etc.) of the object in the image. Step 1412 includes searching for a representation of the object in the image, e.g., in the search area, by correlation with the template. Once the position, orientation, etc. of the representation of the object in the image is determined, it can be stored for subsequent use and/or reported, e.g., via a user interface, printer or other output device. The position can also be used for providing graphics in the image and/or for updating camera registration and/or sensor data (step 1414) and/or updating location data (step 1416). This applies also to any of the other approaches discussed herein for detecting a representation of an object in an image.

In particular, camera registration and sensor data are subject to inaccuracies due to, e.g., wind, vibration or other conditions that can cause movement of the camera. Inaccuracies in camera registration data can also occur due to inaccuracies in the position of registration marks in the event facility, inaccuracies in determining the camera location and so forth. By updating the camera registration and/or sensor data for many or all frames based on the detected position of an object, these inaccuracies can be compensated. Further, the camera registration and/or sensor data for a given frame can be refined using the updated camera registration and/or sensor data from a prior frame so that the data is continuously refined from image to image. Thus, one approach involves updating registration data of a camera based on the position of the representation of an object in an image. Another approach involves updating sensor data of a camera based on the position of the representation of an object in an image. Another approach is to compute a new transformation matrix or function based on the position of the representation of an object in an image. The transformation matrix or function can provide a conversion between an image coordinate system and a world coordinate system, or between an uncorrected image coordinate system and a corrected image coordinate system, or otherwise between different image coordinate systems, for instance.

Further, location data of the object in the live event, Such as from a GPS receiver, is subject to inaccuracies. Thus, a transformation of an object location from world coordinates to image coordinates may not align with the video image of the object due to such inaccuracies. One approach to determining whether the camera data or the location data is incorrect is to observe the expected locations of multiple objects in an image based on their location data relative to their actual locations in an image and relative to reference locations in the image, such as the wall at the edge of a race track. If the expected locations of all of the objects are offset by a certain amount in a similar way, this indicates the inaccuracy is likely due to the camera registration and/or sensor data. For example, FIG. 8 depicts how models 802 and 812 are offset similarly from objects 800 and 810, respectively. If the expected locations of some of the objects are offset by a certain amount in a similar way while the expected locations of other objects are offset by a different amount, this indicates the inaccuracy is likely due to the location data of the offset objects. A human operator can observe the images with the overlaid models to make this determination, or this process can be automated. Moreover, tracking of a stationary object such as a wall or pole will give a better sense of registration inaccuracies compared to tracking a moving object. Once it is determined that an inaccuracy is caused by the location data of a particular object, an appropriate update can be applied to the location data of that object for the current image and/or subsequent images.

FIG. 14*b* depicts a process for updating camera registration and/or sensor data (step 1420). Step 1422 includes determining camera registration and/or sensor data which corresponds to the detected position of an object in an image. Step 1424 includes determining an offset to the camera registration and/or sensor data based on an offset between the detected position of the object in the image and a position of the object in the image which is based on the location data. The offset may be expressed in image space as ($\Delta$sx, $\Delta$sy), for instance. Further, the offset in pixel space may be converted to registration data adjustments, and pan and tilt offsets, for example. Step 1426 includes applying the offset to camera registration and/or sensor data for a next image. In another approach, instead of determining an offset, new camera registration and/or sensor data can be determined outright based on the detected position of the object in the image, and this new data can be used for the current and/or subsequent images. The process can be repeated for each successive image.

FIG. 14*c* depicts a process for updating location data (step 1430). Step 1432 includes transforming the detected position of the object in the image from pixel space to an updated location in world coordinates. Step 1434 includes determining an offset in world coordinates between the original location and the updated location. The offset may be expressed as a 3d vector in world coordinates, for instance. Step 1436 includes applying the offset to location data for the current and/or subsequent image. The process can be repeated for each successive image.

Note that in this and other flowcharts the steps depicted need not occur as discrete steps and/or in the sequences depicted. Further, the detection of one or more objects can occur repeatedly, once for each image in a series of images such as a video broadcast.

Figure 15A:
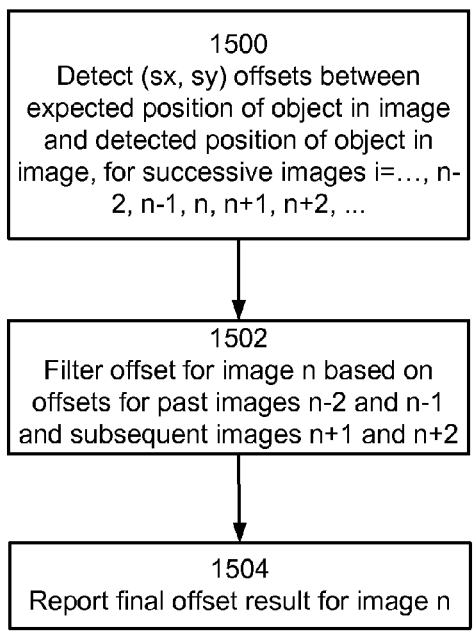
FIG. 15a depicts processing of offset data using past and/or future images.

FIG. 15*a* depicts processing of offset data using past and/or future images. The offset or inaccuracy between the expected position of an object in an image based on location data of the object and the detected position of the object in the image can be determined for successive images. Further, the offset for a given image can be processed based on the offset from past and/or future images. Appropriate buffering or delay techniques can be used. For example, at times, the car or other object can be obscured by objects around the track (e.g., buildings, fences, motorhomes, flags, etc). When this happens, the correlation between the template and image is poor and can result in a match, i.e., a detected object position in the image, that is not correct. This problem can be addresses by storing the (sx, sy) image offset between the object in image space and where the matching algorithm finds a match, for successive images. This offset tends to move slowly as the car progresses around the track. We can also look into the future by processing every frame of video, but reporting a final result several frames behind. Thus we can evaluate the (sx, sy) offsets of matches in the past as well as (sx, sy) offsets of matches in the future. In the process of reporting the final result of the detected position of the object in an image we can run a median filter on the sx, sy offset over successive images. This tends to remove outlying answers that are erroneous when the object is obscured.

In an example process, step 1500 includes detecting an (sx, sy) offset between the expected position of object in an image, e.g., based on location data of the object in the live event transformed to image space, and the detected position of the object in the image, for successive images i= . . . , n−2, n−1, n, n+1, n+2, . . . . Step 1502 includes filtering the offset for image n based on offsets for past images n−2 and n−1 and subsequent images n+1 and n+2. In this example, two previous images and two subsequent images are used for filtering, although this can vary. Step 1504 includes reporting a final offset result for image n based on the filtering.

Figure 15B:
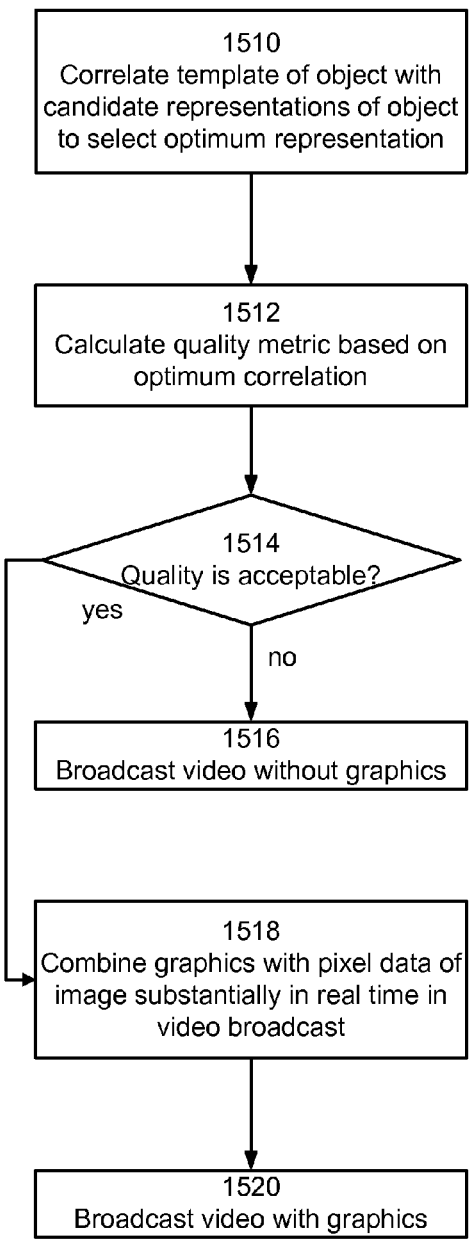
FIG. 15b depicts a process for determining whether to add a graphic to video based on quality metric.

FIG. 15b depicts a process for determining whether to add a graphic to video based on quality metric. In some case it may not be possible to identify an object in an image with good reliability. This can occur due to weather or lighting conditions, the presence of occluding objects or structures, or other factors. Accordingly, it can be desirable to provide a quality check before combining graphics with an image based on object detection. In one approach, this can be achieved by providing a quality metric which is based on the correlation of the template to the object in the search area. As mentioned, one or more template can be correlated with different candidate representations of an object in a search area. The template can be shifted one pixel at a time in horizontal and vertical directions and a cross-correlation performed at each position. Shifting by sub-pixel amounts is also possible as are scale, skew and rotation operations. The position which results in the highest correlation value can then be taken as the detected object position, in one approach. Further, the correlation value itself can be take as a quality metric or associated with a quality metric so that a stronger correlation is associated with a greater quality.

Best quality may also be determined through a combination of best correlation along with other parameters such as expected position or correlations achieved through alternate pattern recognition techniques.

Step 1510 includes correlating a template of an object with candidate representations of the object to select an optimum representation. Step 1512 includes calculating a quality metric based on the optimum correlation. Decision step 1514 determines whether the quality is acceptable, e.g., based on whether the quality metric exceeds a threshold. If the quality is not acceptable, the video is broadcast without graphics, at step 1516. Or, the video can be broadcast using no correction, or using an interpolated or extrapolated correction from corrections to nearby images. If the quality is acceptable, graphics data is combined with pixel data of the image substantially in real time in a video broadcast, in one possible approach, at step 1518. Finally, step 1520 includes broadcasting the video with the graphics.

FIG. 16 depicts a process for detecting a representation of an object in an image via edge and morphology based template matching. Refer also to the discussion in connection with FIGS. 4-7. Step 1600 includes obtaining an image of a live event which include one or more objects which are to be tracked, e.g., detected in the image. Step 1602 includes determining a corresponding location of the object, e.g., at a time which corresponds to a time the image was captured. Note that location data, as well as other data such as camera sensor data, can be interpolated as it will not necessarily coincide precisely with the image capture time. Step 1604 includes determining an orientation of the object at the time of the image. Step 1606 includes obtaining camera registration and sensor data at the time of the image. Step 1608 includes determining an estimated location, size and orientation (skew, distortion, etc.) of a representation of the object in the image. Step 1610 includes defining the template based on the estimated location, size and orientation of the object in the image, and defining the search area based on the size and location of the template. For example, the template can be obtained by rendering a model of the object in the estimated location with the estimated orientation, and the search area can be determined around the rendered model. Step 1612 includes detecting first edges in the search area which extend in a first direction: The first direction can be perpendicular to a direction of motion, horizontal across the image, or any other direction.

We can also do edge detection in one or many directions, not just two directions. We can also use camera pan/tilt rate, focus, and shutter time to estimate the amount and nature of blur expected in the image.

Step 1614 includes detecting second edges in the search area which extend in a second direction. The second direction can be perpendicular to the first direction, parallel to the direction of motion, vertical across the image, or any other direction. Step 1616 includes dilating the first edges and step 1618 includes selecting the second edges which intersect the dilated first edges. Non-intersecting second edges are discarded, in one approach. Step 1620 includes combining the first edges with the selected second edges, and step 1622 includes performing morphological processing of combined edges to obtain a representation of the object. Finally, step 1624 includes correlating a template of the object with candidate representations of the object in the search area to select an optimum representation.

Figure 17:
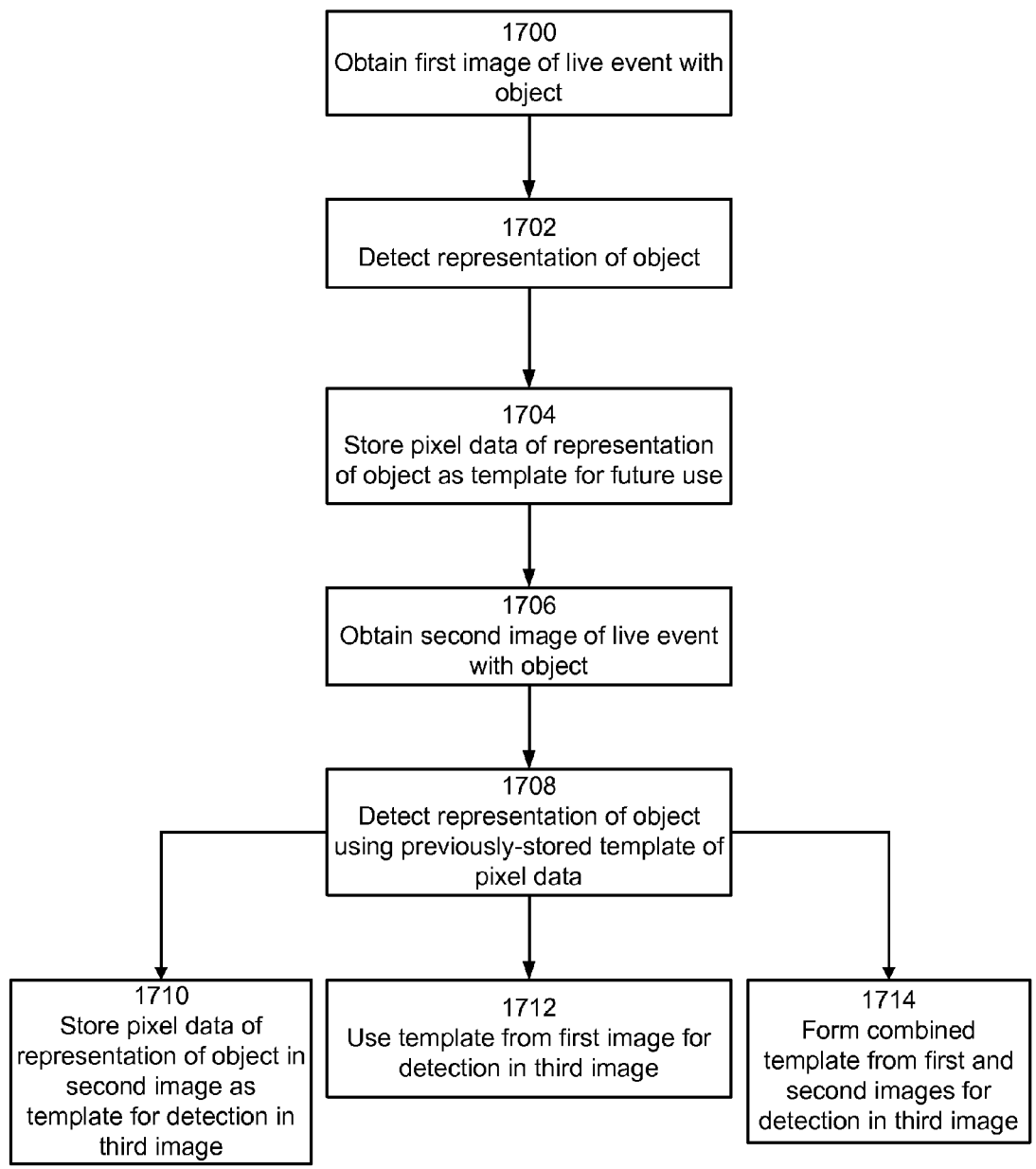
FIG. 17 depicts a process for detecting a representation of an object in an image using a template formed from video data of a prior image.

FIG. 17 depicts a process for detecting a representation of an object in an image using a template formed from video data of a prior image, e.g., prior to the image in which object detection occurs. It is also possible to transform the template in scale, orientation, etc. based on expected appearance—either through interpolation/extrapolation, or through pan, tilt and zoom (PTZ) and position data. See also FIG. 3, which provides an example of such a template 300. In another approach, a video template can be a composite of video templates in multiple prior images. Also, multiple templates might be used, for example, one for each color component or other processing of the image.

Further, the template may be updated for each current image so that a template from the last prior image is used in the detecting of each current image. Or, a given template may be used in the detecting of a number of successive images. In another approach, discussed in connection with FIG. 19, different video templates can be indexed to object location and/ or camera sensor data. These approaches are all advantageous since the video template can be affected by the same lighting, weather conditions and other factors which are experienced by the images in which detection occurs, thus allowing more accurate matching.

Further, the video or pixel template can include luminance and/or chrominance data, and the chrominance data can be provided in any color space. Luminance and chrominance imply a subset of the color spaces. RGB, for example, doesn't break down into these components, but may also be useful component by component. The matching or correlating with the image data in the search area can generally occur in the same color space, or portion thereof, as the video template. Also, as mentioned previously, and as discussed in connection with FIG. 18, matching using a video template can be valuable by itself or in conjunction with other matching techniques.

Step 1700 includes obtaining a first image of a live event which includes one or more objects to be tracked. Step 1702 includes detecting a representation of the object in the first image, e.g., by correlation with a video, binary or other template or via other pattern detection technique. The representation of the object in the first image could also be determined manually by a human operator using an appropriate interface. Step 1704 includes storing pixel data of the representation of the object as a template for future use. In one approach (see FIG. 3), a rectangle which is a portion of the image is stored as the template. The template can be stored in a volatile working memory of a processor and/or a hard disk or other non-volatile storage, for instance. Step 1706 includes obtaining a second image of the live event which includes the object. For example, this can be the next frame in a video signal. Step 1708 includes detecting a representation of the object by correlation using the previously-stored template of pixel data.

At this point, at least three different paths can be taken. Step 1710 includes storing pixel data of the representation of the object in the second image as a template for detection in a third image. In this case, the template obtained from the first image is no longer used and can be discarded. Step 1712 includes using the template from the first image for detection in the third image. In this case, no template is obtained from the second image, and the template from the first image is reused in the third image. Step 1714 includes forming a combined template from the first and second images for detection in the third image. The combined template can be formed, e.g., by taking an average or other statistical metric of pixel values for corresponding pixel locations in the templates and may involve transforming templates based on expected or measured parameters.

In addition, a third template can be constructed using the first and second templates and knowledge of the geometry of the transformation from world coordinates to image coordinates in both cases. For example, textures can be derived from the first template and texture mapped onto a model of the object in proper orientation for the first template. Similarly, textures from the second template can be derived and texture mapped onto the same model of the object in proper orientation for the second template. This can provide texture mapped image data on a greater portion of the model than from a single template. This process can be extended to any number of templates.

FIG. 18 depicts a process for detecting a representation of an object in an image using multiple templates. As discussed, an object can be detected in an image using multiple templates. A final result which indicates the position can be determined based on the results from matching with each template. Further, multiple results can be obtained from the same template to provide a result with greater reliability.

Step 1800 includes obtaining a first image of a live event which includes one or more objects to be tracked. Step 1802 includes detecting a representation of the object in the image, e.g., by correlation with a video, binary or other template or via other pattern detection technique. Step 1804 includes storing pixel data of the representation of the object as a first template. Step 1806 includes obtaining a second image of a live event which includes the one or more objects to be tracked. Step 1808 includes detecting a first representation of the object in the second image using the first template. Step 1810 includes detecting a second representation of the object in the second image using a second template, e.g., which is based on a model of the object, configured with an appropriate orientation and size. In one approach, the second template can be analogous to the binary template 700 of FIG. 7.

In another approach, the template can comprise a model of the object which has a texture that mimics a texture of the object. For example as discussed in connection with FIG. 10, see models 1002 and 1012. Information regarding the paint scheme of each object, such as cars in a race, can be combined with knowledge of the shape of each object to provide the models depicted using known modeling techniques such as texture generation and texture mapping. Lighting models can also be used to set the model texture. For example, when rendering the object model, lighting models and shadow rendering techniques can be used to make the rendered object look more realistic, i.e., look more like the real object in the video. The luminance and chrominance data of the model can be used as a template. The texture can be a pre-created skin or created on the fly from matched positions in a video of the object, e.g., during training laps before a race. In other words, the texture can be reconstructed or refined from video data. Further, the textured model template can used alone or in combination with another template as discussed herein in connection with FIG. 18.

Further, the detecting of step 1810 can be performed over a smaller search area than a larger area used in step 1808 based on the object position detected in step 1808, e.g., to fine tune the match found in step 1808. For example, the smaller area can be at least partially within the larger area. This approach can also reset an accumulating error which can occur when a purely pixel template based approach is used from frame to frame and then the next frame and so on. Step 1812 includes optionally assigning a weight to each result. For example, refer to the weighting schemes discussed in connection with FIG. 7. Step 1814 includes determining a final position of a representation of the object in the image based on the multiple results. Obtaining a final result by merging or comparing results from multiple detecting techniques is discussed further in connection with FIG. 7.

FIG. 19 depicts a process for detecting a representation of an object in an image using templates indexed to location and/or camera sensor data. Object detection can be facilitated when the object repeatedly traverses a course since lighting, camera angles and the like tend to be repeated at different locations along the course. In one approach, templates for detecting the object can be obtained when the object is at different locations along the course in a first traversal of the course. During a second or other subsequent traversal of the course, the templates can be retrieved and used for object detection for images that are obtained when the object is at the different locations along the course. The templates can be stored indexed to location data and/or camera sensor data, which is a proxy for location data.

In an example approach, in a first traversal, which may be a practice lap of a race, for instance, location data from the object is recorded periodically, e.g., once per second, or at designated locations around the course, as world coordinates (wx, wy, wz). The templates may be pixel templates (see FIG. 3), for instance, which are obtained from the images which correspond in time to the locations, and stored indexed to the location data, (wx, wy, wz), for each entry. Or, the templates can be edge and morphology based templates, or other types. During a second traversal, location data of the object which corresponds to each image is obtained, and the corresponding template is retrieved for each image and used for object detection. The location data used for indexing which is closest to the location data obtained in the second traversal may be selected, in one approach.

In an example process, step 1900 includes obtaining a first set of images of a live event which includes an object at different locations, e.g., along a course. Step 1902 includes detecting a representation of the object in each image, which need not be every available image, using any detection technique. Step 1904 includes storing templates of the representation of the object in each image. Step 1906 includes indexing the templates to location and/or camera sensor data. Step 1908 includes obtaining a new image, e.g., as the object traverses the course a second time. Step 1910 includes determining location and/or camera sensor data for the new image. Step 1912 includes retrieving the corresponding template, and step 1914 includes detecting a representation of the object in the new image using the template. It is also possible to detect a representation of the object in multiple new images using one retrieved template.

FIG. 20 depicts a process for storing camera registration-related data indexed to location and/or camera sensor data. As mentioned in connection with FIGS. 14a and b, updated or new camera registration and/or sensor data can be provided for each image in a video signal based on the position of a detected object in an image. Further, the updated or new camera registration and/or sensor data from a given image can be used in a next image. In this way, the camera registration and/or sensor data can be continuously refined so that object detection is facilitated and smaller search areas can be used. In another approach, updated or new camera registration and/or sensor data can be obtained and stored for different locations which an object traverses, e.g., along a race track or other course. During a first traversal of the course. During the second or other subsequent traversal of the course, the updated or new camera registration and/or sensor data can be retrieved and used for object detection for images that are obtained when the object is at the different locations along the course. The updated or new camera registration and/or sensor data can be stored indexed to location data and/or camera sensor data which is a proxy for location data.

In an example approach, in a first traversal, location data of the object is recorded periodically, e.g., once per second, or at designated locations around the course, as world coordinates (wx, wy, wz). The updated or new camera registration and/or sensor data is determined and stored indexed to location, (wx, wy, wz), or camera sensor data, for each entry. During a second traversal, location data or camera sensor data is obtained for each image, and the corresponding updated or new camera registration and/or sensor data is retrieved for each image and used to define a search area for object detection. The location data or camera sensor data is used for indexing which is closest to the location data or camera sensor data, respectively, obtained in the second traversal may be selected, in one approach. Or, we can interpolate or build a correction surface model. It is also possible to store updated or new camera registration and/or sensor data from the second traversal for use in the third traversal, and so forth.

In an example process, step 2000 includes obtaining a first set of images of a live event which includes an object at different locations, e.g., along a course. Step 2002 includes detecting a representation of the object in each image using any detection technique. Step 2004 includes determining camera registration-related data for each image, e.g., based on the detected representation of the object in each image. The camera registration-related data can include updates to registration parameters and/or registration parameters themselves. Step 2006 includes storing, the camera registration-related data for each image. Step 2008 includes indexing the camera registration-related data to location and/or camera sensor data.

Optionally, steps 2000 and 2002 are not used. Instead, the camera follows the object at different locations in the live event but does not capture images, or the images are captured but not used in detecting the representation of the object in each image.

FIG. 21 depicts a process for determining a search area for detecting a representation of an object in an image using camera registration-related data indexed to location and/or camera sensor data. Once the process of FIG. 19 is performed, the indexed camera registration-related data can be used in a subsequent traversal of the course. In an example process, step 2100 includes obtaining a new image, e.g., as the object traverses the course a second time. Step 2102 includes determining location and/or camera sensor data for the new image. Step 2104 includes retrieving the corresponding camera registration-related data. Step 2106 includes transforming the location and/or camera sensor data to an estimated position in the new image using the camera registration-related data. For example, this can include providing a transformation function which is based on the camera registration-related data, and applying the transformation to the location and/or camera sensor data. Step 2108 includes determining a search area in the new image based on the estimated position of the object in the image. Due to the improved accuracy of the estimated position in the new image which results from the use of the stored camera registration-related data, a smaller search area can be used than if would otherwise be the case. Finally, step 2110 includes detecting a representation of the object in the search area. It is also possible to store new camera registration-related data from the second traversal for use in the third traversal, and so forth.

Figure 22A:
FIG. 22a depicts a color profile.

FIG. 22a depicts a color profile. In one approach, a color profile or signature involves a distribution of color data of an image of an object across a color space palette. The color profile can be expressed by a histogram, where each vertical bar indicates, by its height, a number of pixels which have been classified into a particular bin or range of colors in a color space. Most color spaces include multiple components. For example, a 24-bit implementation of the RGB color space includes 8-bits (256 levels, labeled from 0-255) each for red, green and blue components. A color profile can include bins which each encompass a range of color components. In an example approach, each color component is divided into eight color component bins, one bin each for levels 0-31 (B0), 32-63 (B1), 64-95 (B2), 96-127 (B3), 128-155 (B4), 156-203 (B5), 204-236 (B6) and 237-255 (B7). B0-7 denotes color component bins 1-7, respectively. Further, using the nomenclature of R-B1 through R-B7 for bins 1-7 of the red (R) component, G-B1 through G-B7 for bins 1-7 of the green (G) component, and B-B1 through B-B7 for bins 1-7 of the blue (B) component, bins for the entire color space can be defined by a combination of the bins for the individual color components. A total of 512 (8×8×8) bins can be defined. For example, color space bin #1=[R-B0, G-B0, B-B0], color space bin #2=[R-B1, G-B0, B-B0], color space bin #3=[R-B2, G-B0, B-B0], . . . and color space bin #512 [R-B7, G-B7, B-B7]. The example can be modified for other color spaces, e.g., YUV, HSV, monochrome and so forth.

Thus, color data of a representation of the object can be classified into different bins for different color components of a multi-component color space, e.g., bins for R, bins for G and bins for B components. And, a color profile of the representation of the object can be obtained by classifying the different bins for the different color components into different bins for the multi-component color space, e.g., color space bin #1, #2, #3, etc.

We need not always construct a 3D histogram with all three color components. For example, we can obtain a 2D histogram (8×8=64 bins, for example) with only the H and S components of the HSV color space. Further, a 1D histogram (with just 8 bins, for example) with, say, just the R component of RGB is possible as well. Further, multiple 1D and 2D histograms can be used in combination. For example, we may use a 2D histogram for the H and S components of the HSV color space and combine this 2D histogram with a 1D histogram for the V component of the HSV color space. As another example, three 1D histograms, each for H, S and V components, may be combined.

Further, rather than using a "fixed" histogram, one could use a histogram of "ranges" containing the minimum and maximum expected color content for each color bin in the histogram. These ranges can be used to accommodate changes in lighting, vehicle orientation, or the viewpoint of the vehicle from the camera, for example. The viewpoint may be expressed in terms of camera sensor parameters, for instance. Moreover, it is possible to consider only the color composition of the object while disregarding the pattern made by those colors. One can consider only the colors of the object in question, using a mask to avoid consideration of background colors. This mask could be made from a model of the object along with the position information for that object and the camera registration/pan, tilt, zoom (PTZ) parameters. Further, colors which are common to objects which are being distinguished from one another may be excluded. One might also produce a three (or more) dimensional histogram such that color composition can be looked up by object orientation as well.

Figure 22B:
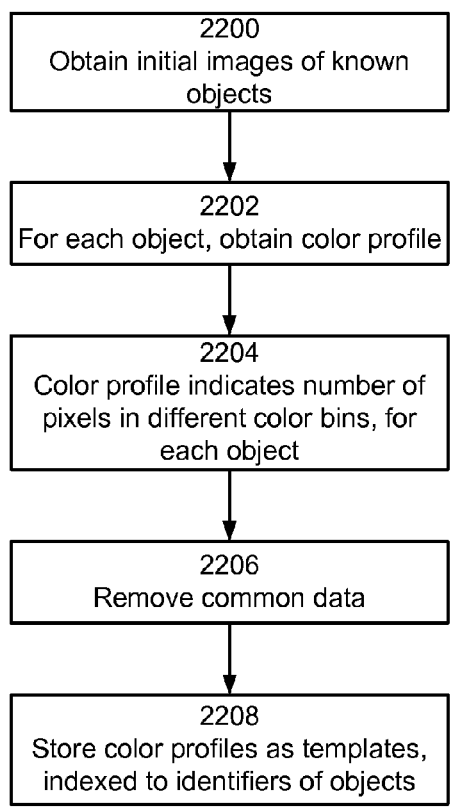
FIG. 22b depicts a process for storing color profiles of known objects.

FIG. 22b depicts a process for storing color profiles of known objects. In an example process, step 2200 includes obtaining initial images of one or more known objects, such as cars in a race. Step 2202 includes obtaining a color profile for each object. Step 2204 notes that the color profile indicates a number of pixels in different color space bins (e.g., bins #1, #2 . . . as described above) for each object. Essentially, the values of the color components of each pixel are used to classify each pixel into a bin. The number of pixels in each bin is then tabulated. Using the above example, a pixel with an R value of 57, a G value of 89 and a B value of 133 would be classified into color component bins of R-B1 (since 57 is in the range 32-63), G-B2 (since 89 is in the range 64-95) and B-B4 (since 133 is in the range of 128-155). The pixel can then be classified into a color space bin based on the bins of the three components. Step 2206 includes removing at least some color data from the color profiles which is common to the different objects. For example, the color profiles may be based on pixels in a rectangle which bounds the object (see FIG. 3). In this case, some of the background pixels which represent the track may be common to different objects. Another possible approach for removing background pixels is to eliminate known background colors (such as the color of the track) before creating the histograms of the objects. Step 2208 includes storing the color profiles as templates, indexed to identifiers of the objects.

In the example of race cars, the initial images which are used to obtain the color profiles can be obtained, e.g., from prior video images, from static images of the cars or from information regarding the paint scheme of the car.

Figure 23:
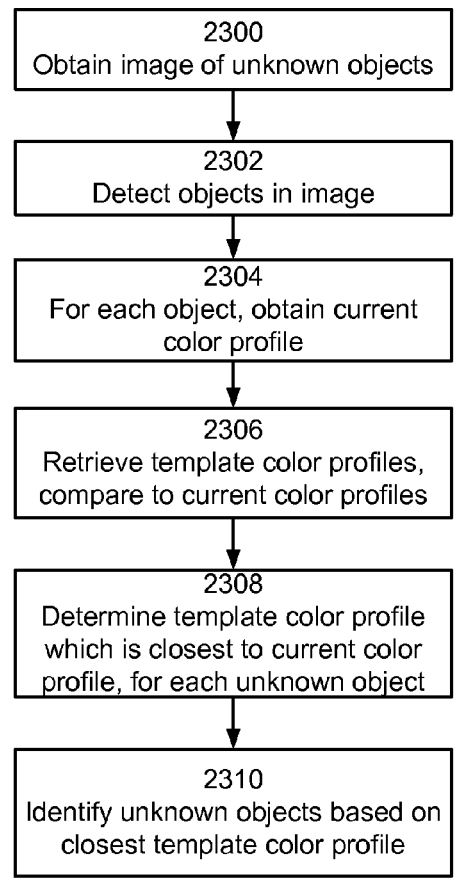
FIG. 23 depicts a process for using stored color profiles to identify an unknown object.

FIG. 23 depicts a process for using stored color profiles to identify an unknown object. Step 2300 includes obtaining an image of unknown objects. Note that the color profiles can be used to identify a single object or to distinguish among multiple objects. Multiple objects are discussed as an example only. Step 2302 includes detecting objects in the images, e.g., using any detection technique. Step 2304 includes obtaining a current color profile for each object. As mentioned in connection with FIG. 22b, this can involve classifying the pixels which make up the object. Surrounding pixels can be used as well, Such as in a rectangle which bounds the object (see FIG. 3). Step 2306 includes retrieving the template color profiles and comparing them to the current color profiles. Step 2308 includes determining a template color profile which is closest to the current color profile, for each unknown object. As an example, a distance between bin #1=[R-B0, G-B0, B-B0] and bin #2=[R-B1, G-B0, B-B0] can be counted as one, since one of the color components differs by one component bin level, and a distance between bin #1=[R-B0, G-B0, B-B0] and bin #3=[R-B2, G-B0, B-B0] can be counted as two, since one of the color components different by two component bin levels. Any type of distance metric can be used to determine the closest match. Step 2310 includes identifying the unknown objects based on the closest template color profile.

Optionally, the color profile matching can occur at different levels of granularity so that a coarser level is used first. If the coarser level results in two or more objects in an image being matched to the same template color profile, or results in a single object in an image being matched to a template color profile which is shared with another object, which is not necessarily in the same image, the matching process can be repeated at a finer level of granularity. For example, the coarser granularity may involve combining the color space bins into "super bins". So, for example, instead of 512 color space bins, there may be 256 super bins. To illustrate, bins #1 and #2 can be combined into a super bin #1. The finer granularity can involve matching at the level of the individual color space bins.

In another option, the color profiles account for lighting changes, camera settings and object orientation. It is also possible for a color profile to be mapped to object orientation relative to the camera. In this manner, we can obtain a histogram or color profile which is based on a specific view of an object, which in turn can be computed based on GPS data, IMU data, camera sensor data, or the like.

Further, the color matching may be used to assist other template matching techniques in finding a correct match to a representation of an object in an image. For example, matching which involves correlating object representations with a pixel template may result in detecting multiple object representations which have the same or similar correlations with the pixel template. In this case, color profile data can be used for the multiple representations to determine which is optimal. Similarly, matching which involves correlating a model template with a morphologically processed image may result in detecting multiple matches which have the same or similar correlations with the template. In this case, color profile data can be used for the multiple matches to determine which is optimal.

FIG. 24a depicts an overview of a system for providing fluid flow data. A further enhancement can be achieved by providing graphics which depict the fluid flow around an object, such as the air flow around a car or other moving object. The techniques provided are generally applicable to other fluid flows such as water flow, e.g., in a boat race. In the context of a race car or other vehicle, for instance, such graphics inform the viewer of how the air flows around the car and how the flow around one car affects another car. Such graphics can be educational as well as entertaining. However, fluid models have conventionally involved computational fluid dynamics (CFD) models which are very computationally intensive. Conventional CFD models are not suitable for use in providing updated graphics for each frame in a video broadcast in real time, for instance. However, fluid flow models which perform most of their computations off-line can be used. One example approach is discussed in A. Treuille et al., "Model reduction for real-time fluids," ACM Transactions on graphics 25(3), SIGGRAPH 2006, p. 826-834, incorporated herein by reference, which describes a model reduction approach to fluid simulation.

One example approach involves calculating the air flow for an object by itself at different object speeds, including, at each speed, time varying effects in the flow field such as swirling. For instance, the time varying effects can include components that vary with different frequencies. A baseline vector field can be defined at a reference speed of the object, and modification factors defined to indicate how the baseline vector field should be modified for different speeds. The baseline vector field defines particle locations and velocities. Further, the air flow can be calculated when the object is near one or more other objects, at different object speeds. Additional modification factors can then be defined to indicate how the baseline vector field should be modified based on the presence of the one or more other objects. Once the above information is obtained before an event, it can be implemented in real time during a live event. For example, a simulation can be run which determines the flow of particles around the object based on the time varying effects and the modification factors. The simulation can be updated for each frame of video to account for frame-to-frame movement of the particles and frame-to-frame changes in the modification parameters, e.g., due to frame-to-frame changes in the object speed and/or positions of nearby objects. In some cases, only relative changes in position between a modeled object and a nearby object need be considered, even though their absolute positions change.

In one possible approach, inputs which are provided to a fluid flow model 2406 before an event (pre-event) include object shape 2400 and the locations of other nearby objects 2404 which are close enough to affect the fluid flow of the subject, modeled object. A working volume 2402 which contains the object is also defined. Outputs of the fluid flow model include a baseline fluid flow in the volume, with time varying information 2408, and fluid flow modification factors for object speed and positions of other objects 2410. The baseline fluid flow can be represented as a baseline velocity/force vector field in the given volume which contains the object, while the modification factors 2410 provide a way to derive modified vector fields from the baseline vector field for various scenarios. These scenarios can include a single object in the volume or multiple moving objects. For example, the baseline vector field can include a baseline velocity field which is modified by adjustments based on other objects around the subject, e.g., modeled, object.

Moreover, a particle of the volume can be expressed by a set of (location, velocity (at reference object speed), force) coordinates, where reference object speed is a particular speed of the object. The location of the particle is defined relative to a designated point, for instance, in a desired coordinate system. The velocity of the particle denotes speed and direction, as a vector. The force can represent a pressure which acts, for instance. Characteristics of each particle in the flow at any given time can be determined for different speeds of the object. The modification factors can be ratios which are expressed by equations, lookup tables or the like. Furthermore, interpolation may be used as needed.

For example, a reference object speed at which the baseline vector field is set may be 100 mph. The flow is then expressed by a set of (location, velocity (at object reference speed), force) coordinates for all points in the volume. For other object speeds, the flow can be expressed by a set of (location, velocity (at object reference speed)×modification factor, force) for all points in the volume. Thus, the particle velocity can be adjusted upward or downward, generally, for object speeds higher or lower than the reference speed. The modification factor will generally depend on the location of the particle in the flow as well. Thus, modification factors can be expressed as a set of (location, modification factor) coordinates for each particle. Modification factors can be determined at different object speeds such as 110 mph, 120 mph and so forth, as well as for different relative locations of other objects. Interpolation can be used for intermediate speeds and locations.

For example, modification factors at 110 mph and 120 mph, which are output from the pre-event processing, can be interpolated during the event to provide a modification factor for 115 mph. As a specific example, a baseline vector field component for a particle at a location on the roof of the car may indicate a velocity of 120 mph at a car speed of 100 mph due to a relatively low pressure on the roof. A modification factor may be a multiplier of 1.05 at a car speed of 110 mph and 1.10 at a car speed of 120 mph, so that the updated vector field component for the particle is 126 mph at 110 mph or 132 at a car speed of 120 mph.

As mentioned above, the simulation can also account for the fact that there are one or more other objects near the subject object for which the flow is being calculated. For example, with cars, the fluid flow data can be obtained with a second car directly behind the subject car by 10 feet, 20 feet and so forth. The flow data can similarly be obtained with a second car behind the subject car by 10 feet, 20 feet and so forth, and offset laterally to the left or right by 5 feet, 10 feet and so forth. The flow data can similarly be obtained with a second car in front of the subject car, either directly or offset. Various other combinations of positions of one or more cars relative to a subject car or other object can be employed as well as desired. Moreover, as with speed, interpolation can be used for intermediate locations. For example, modification factors for a car 20 feet behind and 40 feet behind the modeled car, which are output from the pre-event processing, can be interpolated during the event to provide a modification factor for a car 30 feet behind the modeled car.

Further, the identity and characteristics of the one or more other objects near the subject, modeled object can be obtained and factored into the fluid flow via the modification factors. For example, in a race involving different sizes of cars, the identity of a second car near the subject car can be obtained, such as from telemetry data from the second car. Modification factors which are associated with the interfering car can then be obtained for modifying the fluid flow accordingly. Generally, different types of modification factors can be indexed and made available for quick look up during the video processing.

The simulation can also account for the object's position, such as a race car's position, including orientation, on a track.

After the pre-event processing occurs, processing during the event occurs in which the fluid flow simulation 2412 is run to simulate the motion of particles in particle volumes. The fluid flow data can be determined for one or more particular particle volumes, which can be a subset of the overall volume 2402 which is being simulated. Furthermore, each volume includes many particles. The fluid flow simulation can be updated for each video frame, in one approach. For each frame, object speed and position 2414 can be determined, e.g., from GPS sensors, vehicle speed sensors and the like, in real time. The speed and position are types of information regarding movement of the object in the live event. The object's position may include its orientation. Other such information includes acceleration, which may be obtained from accelerometers in the car, for instance. Similarly, the positions of other objects 2418 can be determined. These inputs are provided to the fluid flow simulation 2412 to obtain a current state of the particles 2416, such as positions and velocities. The current state provides a snapshot of the fluid flow at a point in time. In providing the current state, the fluid flow simulation 2412 accounts for time varying effects of the flow due to swirls and the like. The time varying effects can include both periodic and non-periodic components.

Once the particle motion is updated, the object speed and position 2414, and the positions of other objects 2418 are used by a fluid flow lookup function 2420 to adjust the current state of the particles 2416. The fluid flow lookup function 2420 obtains the appropriate modification factors based on the object speed and position 2414 and the positions of other objects 2418, and uses them to directly obtain the corresponding flow data by modifying the baseline flow data. The updated flow data at any given time can be represented by (location, velocity, force) coordinates 2422 for the particles in the simulated volume. Graphics processing 2424 can then occur based on the flow data. For example, the graphics may be color coded selected particles, e.g., above, to the sides and behind the object, based on the particle velocities which are provided by the fluid flow model. Opacity of the colors may also be set. The graphics which represent the fluid flow 2426 can be based on any characteristic of the flow, or data derived from the flow, including aerodynamic forces and coefficients.

Generally, the flow information includes information regarding particles flowing around the object, and is based on the shape of the object. In some car races, for instance, each car has a very similar shape, in which case a generic shape can be used in the model. In other cases, the model can account for different object shapes. In one approach, the fluid flow model 2406 is run for each different object shape. The graphics can be based on characteristics of the flow, such as speed, acceleration and turbulence. In one possible example, the graphics have the appearance of smoke which is flowing past the object. Other possible graphics include continuous lines which depict streams of particles. In another approach, the flow is represented by dots or other shapes which have different sizes based on flow characteristics such as pressure, density or velocity. For example, areas of low velocity can be represented by smaller dots while areas of high velocity are represented by larger dots. Or, the graphics can distinguish areas of laminar flow from areas of turbulent flow. In another approach, the graphics includes arrows which depict localized directions of the fluid flow. In another approach, a variable level of transparency may be used to depict varying information such as air pressure. Further, a varying level of fuzziness or blurriness may be used for the graphics. For example, graphics may be more blurred for lower flow speeds and less blurred, e.g., sharper, for higher flow speeds. The fluid flow model could also account for the particular environment in which the object travels and the position of the object in the environment. For example, for a race car, the fluid flow model might account for the effects of the track banking, turns, bumps or other irregularities in the track surface, tracked pavement type, e.g., dirt, concrete, or cobblestones, proximity of the car to a wall at the edge of the track, effects of bridges, tunnels, or other structures on or near the track, and so forth. Further, the fluid flow model might account for changes in the object itself over time, such as a reduction in weight as fuel is burned. Further, it is possible to combine modeling data from different models, including models which use wind tunnel or other experimental data, models which use data obtained from live events and purely mathematical models. Also, it is possible to provide graphics for multiple objects at the same time. For instance, flow graphics may be provided at the same time for both of the objects 2502 and 2510 in FIG. 25. The graphics may be color coded or otherwise allow the viewer to ascertain which graphics are associated with which object. Or, the graphics may depict an overall fluid flow involving multiple objects. Moreover, in addition to obtaining the speed and position of the cars during the live event for use in determining the fluid flow, information such as pressure and temperature from sensors carried by the cars can be used in determining the fluid flow.

Figure 24B:
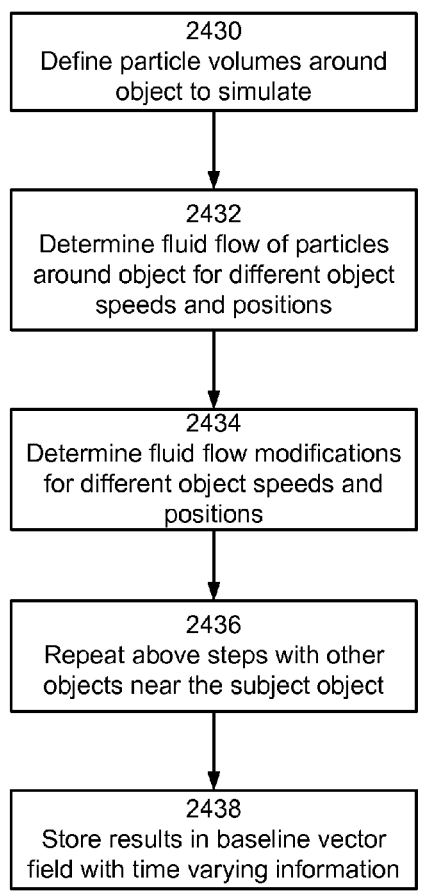
FIG. 24b depicts a process for obtaining fluid flow data before an event.

FIG. 24*b* depicts a process for obtaining flow data before an event. Step 2430 includes defining one or more particle volumes around the object for which flow is being simulated. Step 2432 includes determining the flow for the particles for different object speeds and positions. Step 2434 includes determining the flow modifications for different object speeds, positions or other parameters. Step 2436 includes repeating steps 2430 through 2434 with one or more other objects near the subject object. Step 2438 includes storing the results, such as in a baseline vector field and modification factors based on speed and other the objects' positions, as discussed.

Figure 24C:
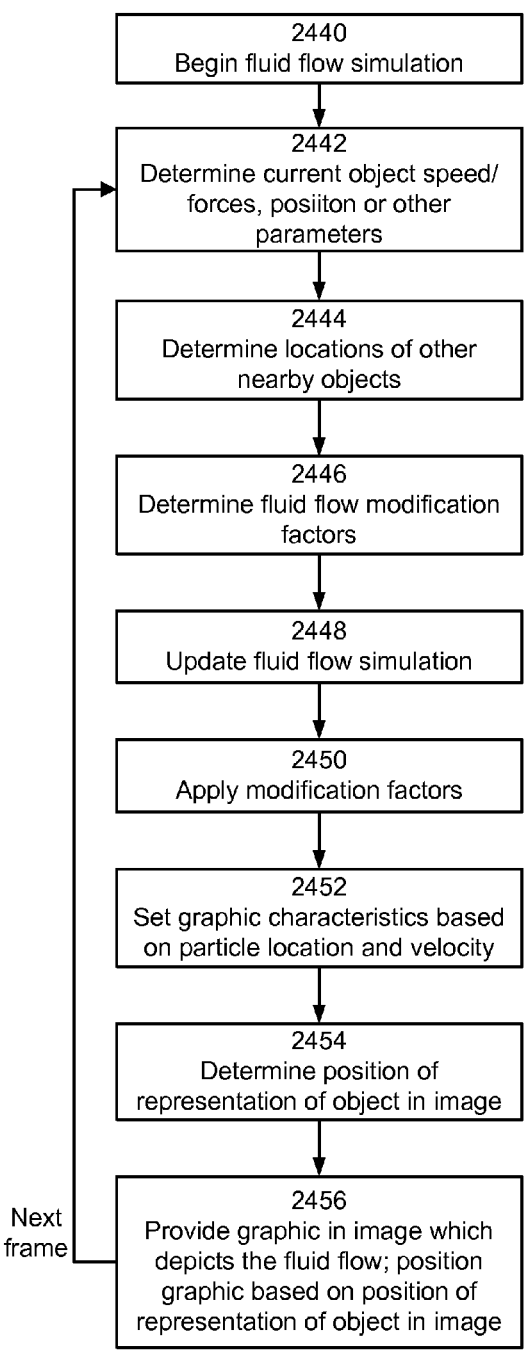
FIG. 24c depicts a process for obtaining fluid flow data during an event.

FIG. 24*c* depicts a process for obtaining flow data during an event. Step 2440 includes beginning the fluid flow simulation. Step 2442 includes determining the current speed, forces or other parameters of an object, and step 2444 includes determining the locations of other nearby objects. For example, the speed and locations can be based on instrumentation carried by the cars and sent by wireless link to the production facility 140. Location data provided by a car can be used to calculate its speed based on a rate of change of location, or data from an onboard speedometer can be obtained. Step 2446 includes determining a fluid flow modification factor or factors, e.g., based on object speed and, optionally, the location of one or more nearby objects. Step 2448 includes updating the fluid flow simulation such as by determining the current position and characteristics of particles in the flow. The current state of the flow is obtained based on how the particles have moved since a prior state.

Step 2450 includes applying the modification factors. At this point, updated particle location, velocity and force data is available. Step 2452 includes setting graphic characteristics, such as color, based on particle location, velocity and/or force, as well as based on the object characteristics such as various forces acting on the object or other object parameters. Or, a single color such as white may be used. Step 2454 includes determining a position of the representation of the object in the image, e.g., using the techniques discussed herein. Step 2456 includes providing one or more graphics in the image which depict the flow. The graphics are positioned based on the position of the representation of the object in the image. Steps 2442 through 2456 may be repeated periodically, such as for every video frame, so that the graphics are regularly updated.

FIG. 25 depicts an image showing flow graphics. The video image 2500 depicts two objects, namely cars 2502 and 2510. Graphic 2504 and 2506 depict air flowing around the object 2502 as smoke, while a graphic 2512 depicts air flowing around the object 2510 as smoke.

FIG. 26 depicts an image having a graphic which depicts forces acting on the object and aero-status of the object. Here, a portion of the video image 2500 is provided by image 2602. The object 2502 is included with the smoke graphic 2504. A portion of the object 2510 is included. Note that a portion of the smoke graphic 2504 is visible in the foreground of the object 2510. Other portions of the smoke graphic are behind the object 2510, that is, occluded by the object 2510. This provides additional realism to the graphics so that they appear to be part of the live event.

Additional graphics, discussed further below, can also be provided. For example, a graphic 2604 indicates a degree of aero-tight or aero-loose which is experienced by the object. The vertical arrow 2606 can move horizontally in successive video frames as the degree of aero-tight or aero-loose changes from frame to frame. Further, a graphic 2610 depicts a down force on the object, while the graphic 2620 depicts a side force on the object. The use of an arrow graphic to depict aero-tightness or aero-looseness is just one example of a possible graphic for expressing such information. A dial, vertical bar, or other technique can be used as well. Similarly, the down force, side force or any other aerodynamic force can be expressed in a number of ways.

Figure 27:
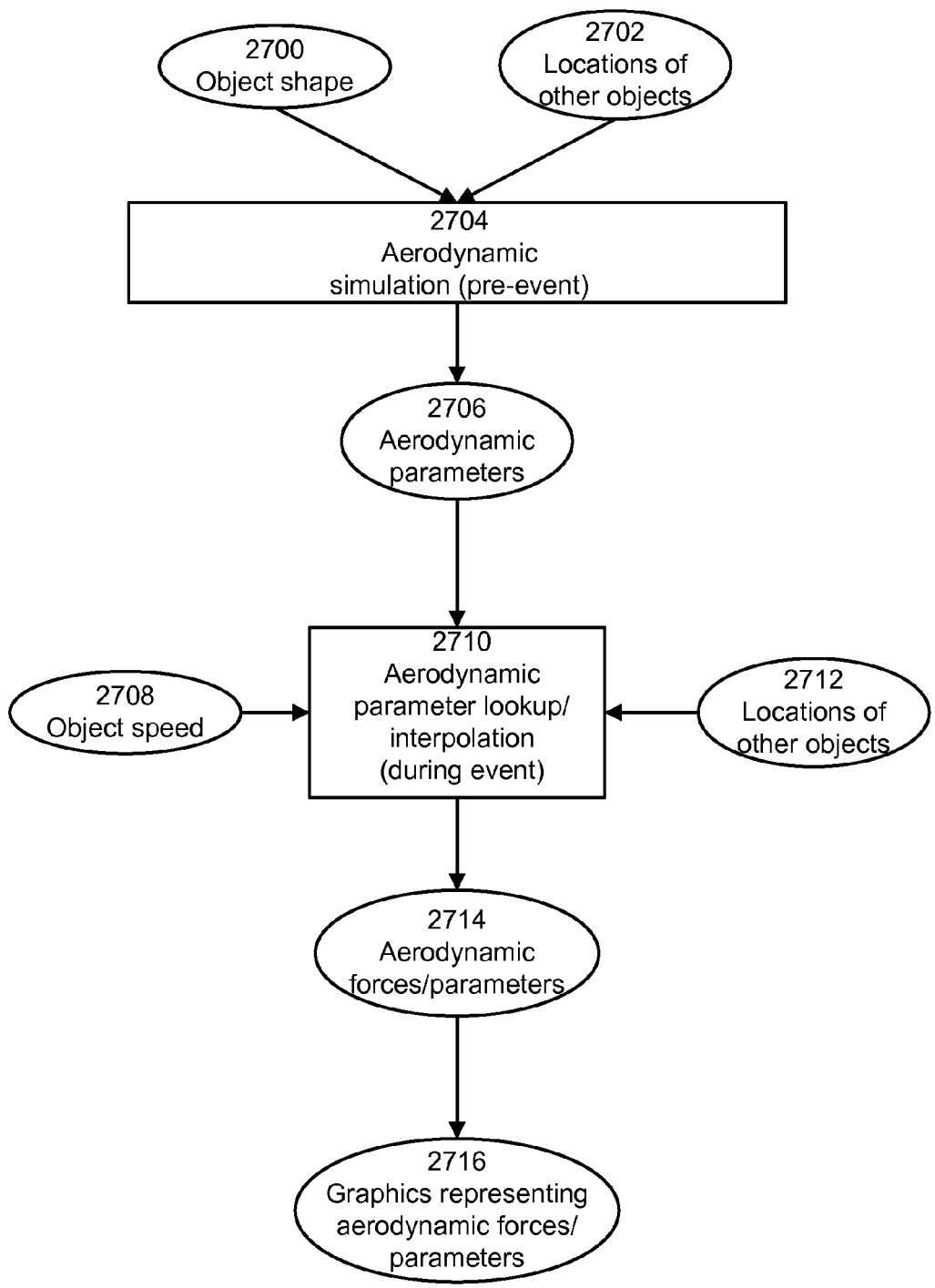
FIG. 27 depicts an overview of a system for providing aerodynamic forces/parameters.

FIG. 27 depicts an overview of a system for providing aerodynamic forces/parameters. The system is depicted in a conceptual overview which includes an aerodynamic simulation 2704. The aerodynamic simulation 2704 receives inputs such as object shape 2700 (e.g., including drag coefficient data) and locations of other objects 2702 and provides aerodynamic parameters 2706 as an output. The aerodynamic simulation 2704 can be similar to the fluid flow model discussed previously but fluid flows of particles are not needed. Instead, forces which act on the object due to fluid flow are of primary interest. The aerodynamic parameters 2706 can include baseline aerodynamic force data and modification factors based on object speed and the positions of other objects. Parameters other than force, such as pressure, density and temperature, can also be provided. Based on the aerodynamic parameters 2706, which can be obtained before an event, an aerodynamic parameter lookup/interpolation process 2710 can be employed during the event based on a current object speed 2708 and locations of other objects 2712. This can involve applying the modification factors to the baseline aerodynamic force data, analogous to determining the fluid flow based on modification factors. Note that different modification factors are typically used for the baseline aerodynamic force data and the baseline fluid flow data. However, it is possible for the aerodynamic simulation and the fluid flow model to share data. The process 2710 outputs aerodynamic forces/parameters 2714 which can be used to provide graphics 2716.

In this approach, the aerodynamic model provides information regarding aerodynamic forces on the object. The graphic need not be positioned based on a position of the object in the image. The graphic can be provided in any location on the screen, for instance, together with the associated video. The graphic and/or the data which it represents can also be provided to interested viewers via a computer network, for instance. The aerodynamic forces which are provided can indicate down forces, side forces, positive and negative relative drag forces, and so forth, which act on the object. The forces can be depicted as absolute values or relative changes from some baseline condition, such as when the modeled object is not affected by other objects. For example, a positive relative drag force may be a force at some location on the object which is greater than the baseline drag force, while a negative relative drag force may be a force at some location on the object which is less than the baseline drag force.

Further, an amount of aero-looseness or aero-tightness can be indicated based on a down force on the object. In car racing, such as NASCAR racing, oversteer is equated with "looseness" and understeer is equated with "tightness". Oversteer occurs when a car turns more than commanded by the steering wheel. If the car is at the edge of the ability of its tires to grip the road and the rear tires start skidding before the front tires, the car is said to be loose. The car is said to be tight if the front tires start to skid before the rear tires. The aero-loose condition occurs when the car loses the aerodynamic downforce on the rear tires. Due to the lack of down force on the rear tires, there is less grip than the front tires. As the car reaches the limit of the tire's ability to hold the road, the rear tires will slip before the front tires and the car will be "aero-loose".

For example, the aero-loose condition can affect the car when it is in the cornering process. When the car makes a close inside pass on another car while maneuvering through a corner, the air gets taken off of its spoiler when the spoiler comes up beside the outside car's roof area. This causes the rear of the car to lose grip on the track. This condition also occurs on straight stretches when a car gets close on the rear bumper of the car in front of it. The rear car pushes air under the lead car, causing the air above the lead car's rear spoiler to rise, taking away the down force holding the rear tires to the track. Aero-tightness is the opposite condition, where there is a good down force on the rear but not the front so that the front of the car becomes loose.

In one approach, a baseline level of aero-tightness and aero-looseness can be associated with a baseline condition of the modeled car or other, such as when no other cars are around it. The car may be considered to be neutral or balanced in this case, e.g., being neither aero-loose nor aero-tight. This may correspond to the arrow 2606 in FIG. 26 being at a midpoint on the scale in the graphic 2604. The aerodynamic simulation can determine down forces at the front and back of the car at this baseline condition, e.g., at a given car speed. When one or more other objects affect the aerodynamic forces on the modeled object, the change in the down forces at the front and back of the car from the baseline condition can be translated to a degree of aero-tightness or aero-looseness. For example, the down force at the back of the car may be reduced when a second car gets close to the rear bumper of the car, causing a degree of aero-looseness. A higher reduction in down force from the baseline condition can be translated to a higher degree of aero-looseness. In this case, the arrow 2606 is moved to the right in the graphic 2604. The amount by which the arrow 2606 is moved can be based on a linear or non-linear scale, and the range of the scale can be based on the expected degree of aero-looseness and aero-tightness.

To illustrate, assume that, at 100 mph, in a balanced state, the rear axle of the modeled car has an aerodynamic down force of 400 lbs. and the front axle of the modeled car has an aerodynamic down force of 200 lbs. If the presence of another car behind the modeled car results in the rear axle of the modeled car having an aerodynamic down force of 200 lbs. instead of 400 lbs, while the aerodynamic down force on the front axle is relatively unchanged, the arrow 2606 can be moved part way to the right in the graphic 2604. If the presence of the other car subsequently results in the rear axle of the modeled car having an aerodynamic down force of 100 lbs. instead of 400 lbs, while the front axle is relatively unchanged, the arrow 2606 can be moved further to the right in the graphic 2604 since the modeled car is more aero-loose than with a 200 lb. down force. The arrow 2606 can be similarly moved to the left in the graphic 2604 to express a degree of aero-tightness. A graphic may also be used to express whether the car is aero-tight or aero-loose, regardless of the degree. It is also possible to provide a graphic such as a flashing red light which indicates that the car may lose control due to too much aero-looseness or aero tightness. A corresponding audible warning can similarly be provided in the video broadcast. The aerodynamic simulation can also provide information regarding other effects of two or more cars interacting. For example, data regarding a race car's effective horsepower increase and down force pressure as a result of drafting (one car following closely behind another car, in its slipstream) can be provided. The effective horsepower increase can be obtained based on the reduction in drag on the drafting car using known mathematical relations. The car's drag coefficient and speed can be used by the aerodynamic model to determine the drag. That is, with drafting, a car may need 200 hp to maintain a given speed, and without drafting, the car may need 220 hp to maintain a given speed. Thus, the effective horsepower increase with drafting is 20 hp. The reduction in drag due to drafting can also be depicted by a graphic. The effects of aerodynamic interactions among objects can be expressed in other ways as well.

Moreover, in addition to obtaining the speed and position of the cars during the live event for use in determining the aerodynamic forces, information such as pressure and temperature from sensors carried by the cars can be used in determining the aerodynamic forces. Also, graphics can be provided which provide a comparison between the aerodynamic forces on different cars or other objects.

Figure 28A:
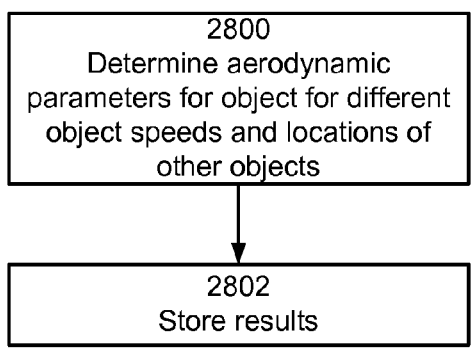
FIG. 28a depicts a process for obtaining aerodynamic parameters before an event.

FIG. 28*a* depicts a process for obtaining aerodynamic parameters before an event. Step 2800 includes determining aerodynamic parameters for an object for different object speeds and locations of other objects. For example, the aerodynamic parameters may include baseline aerodynamic force data and modification factors based on object speed and the positions of other objects. Step 2802 includes storing the results.

Figure 28B:
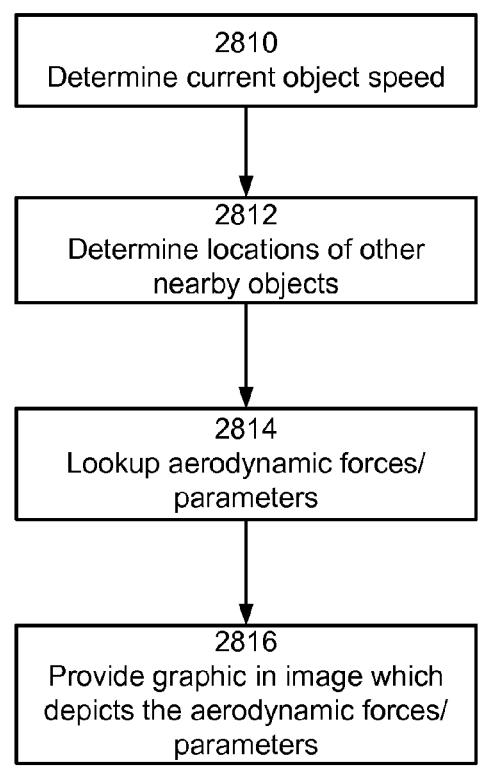
FIG. 28b depicts a process for obtaining aerodynamic forces/parameters data during an event.

FIG. 28*b* depicts a process for obtaining aerodynamic forces and parameters data during an event. Step 2810 includes determining the current speed of an object. Step 2812 includes determining the locations of other nearby objects. Step 2814 includes looking up the aerodynamic forces or other parameters, e.g., based on the current speed of the object and the locations of other nearby objects. For example, the modification factors based on object speed and the positions of other objects may be applied to the baseline aerodynamic forces. Step 2816 includes providing a graphic in the image which depicts the current aerodynamic forces or other parameters. For example, see FIG. 26.

Figure 29:
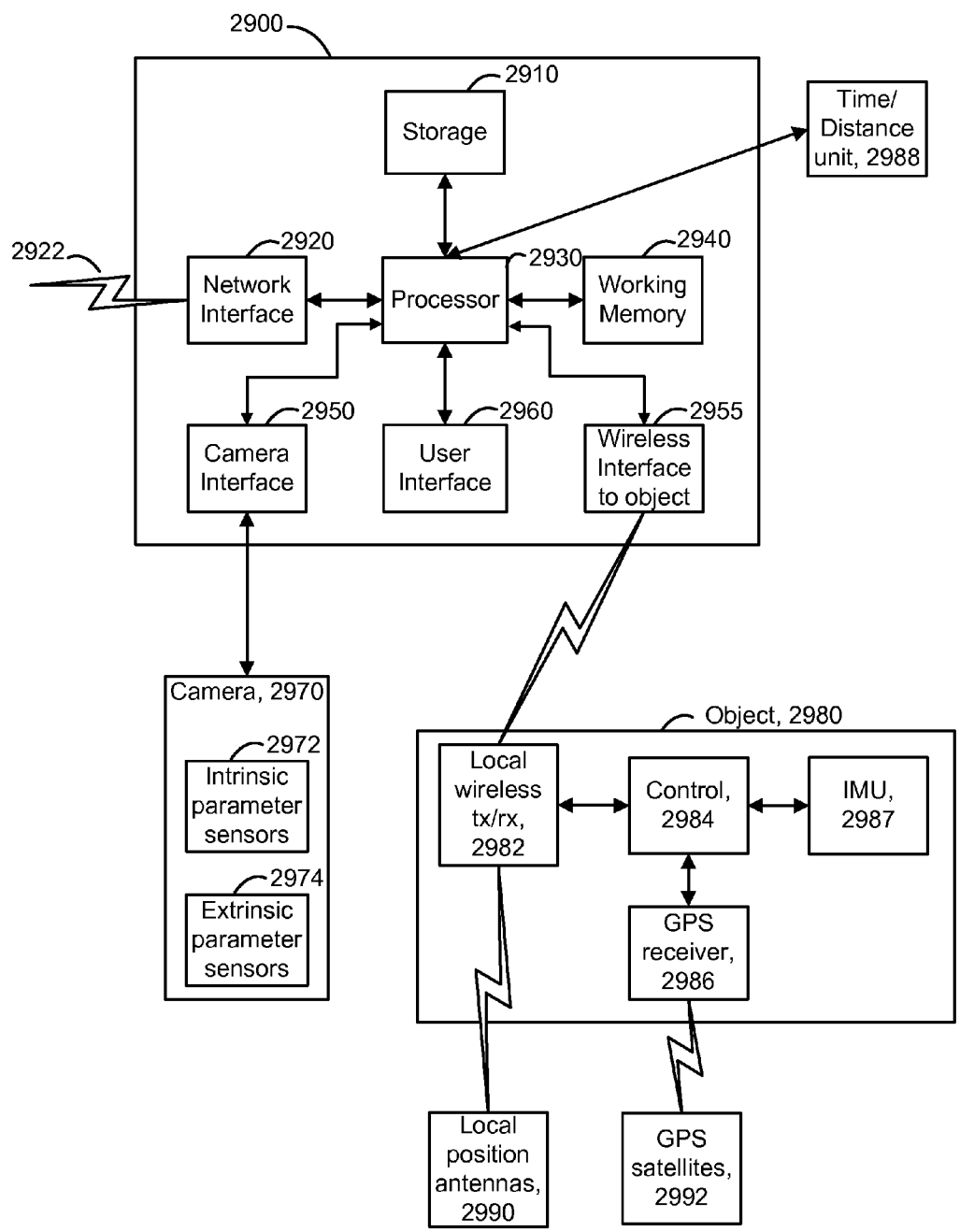
FIG. 29 depicts camera, processing facility and on board object components for implementing the techniques discussed herein.

FIG. 29 depicts camera, processing facility and on board object components for implementing the techniques discussed herein. The computer system 2900 is a simplified representation of a system which might be used at the processing facility 140 (FIG. 1), for instance. The computer system 2900 includes a storage device 2910 such as a hard disk or portable media, a network interface 2920 for communicating with other computer systems, a processor 2930 for executing software instructions, a working memory 2940 such as RAM for storing the software instructions after they are loaded from the storage device 2910, for instance, an example camera interface 2950 (in practice, more than one may be used), a user interface display 2960, and a wireless interface to object 2955. A wireless link 2922 represents a signal transmitted by the antenna 145. The processor communicates with a time/distance unit 2988 which can be used to provide time and/or distance data as discussed in connection with FIG. 1.

The storage device 2910 may be considered to be a processor readable storage device having processor readable code embodied thereon for programming the processor 2930 to perform methods for providing the functionality discussed herein. The user interface display 2960 can provide information to a human operator based on the data received from the camera via the interface 2950. The user interface display 2960 can use any known display scheme, whether graphical, tabular or the like. In addition to an on-screen display, an output such as a hard copy from printer can be provided to report results. Results can also be reported by storing data at the storage device 2910 or other memory, e.g., for later use.

An example camera 2970 includes extrinsic parameter sensors 2972 and intrinsic parameter sensors 2974. The extrinsic parameter sensors 2972 can identify an orientation of the camera, such as a pan and tilt of the camera. The intrinsic parameter sensors 2974 can identify a zoom setting, whether an expander is used and so forth. The camera 2970 communicates image data, whether analog or digital, in addition to data from the extrinsic parameter sensors 2972 and the intrinsic parameter sensors 2974 to the computer system 2900 via the camera interface 2950. It is also possible to determine camera extrinsic and intrinsic parameters without sensors 2972 or 2974, as described above in reference to Tsai's method.

The object 2980 includes equipment that is carried on board, including a control 2984, local wireless transmitter/receiver 2982, inertial measurement unit (IMU) 2987 and GPS receiver 2986. The local wireless transmitter/receiver 2982 can receive signals from multiple local antennas (see also antennas 120, 122, 124 in FIG. 1) to determine a location of the object. The local wireless transmitter/receiver 2982 can also transmit data to the processing facility's computer system 2900, such as location data from the GPS receiver 2986 and orientation data (roll, pitch and heading) from the IMU 2987.

Further, the functionality described herein may be implemented using one or more processor readable storage devices having processor readable code embodied thereon for programming one or more processors to perform the processes described herein. The processor readable storage devices can include computer readable media such as volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method for processing image data, comprising:
obtaining an image of a live event which is captured by at least one camera, the live event comprising an object;
performing first edge detection to detect first edges which extend in a first direction in the image;
performing second edge detection to detect second edges which extend in a second direction in the image;
detecting which of the second edges are near the first edges and which of the second edges are not near the first edges; and
performing morphological processing on the first edges and the second edges which are detected to be near the first edges to obtain a representation of the object, the second edges which are detected to be not near the first edges are not used to obtain the representation of the object.

2. The method of claim 1, further comprising:
providing an estimate of a position of the object in the live event based on a position of the representation of the object in the image.

3. The method of claim 1, further comprising:
updating registration data of the at least one camera based on a position of the representation of the object in the image.

4. The method of claim 1, further comprising:
updating sensor data of the at least one camera based on a position of the representation of the object in the image.

5. The method of claim 1, further comprising:
determining whether a position of the representation of the object in the image is offset from an estimated position due to at least one of registration data or sensor data of the at least one camera, and updating the at least one of registration data or sensor data of the at least one camera if the offset is caused thereby.

6. The method of claim 1, wherein:
the detecting which of the second edges are near the first edges comprises dilating the first edges to provide dilated first edges, and identifying which of the second edges are a specified number of pixels away from the dilated first edges, the second edges which are not the specified number of pixels away from the dilated first edges are not used to obtain the representation of the object.

7. The method of claim 1, wherein:
the first direction is perpendicular to a direction of motion of the object in the image, and the second direction is parallel to the direction of motion.

8. The method of claim 7, further comprising:
identifying the direction of motion of the object based on sensor data of the at least one camera.

9. The method of claim 7, further comprising:
identifying the direction of motion of the object based on movement of the object in multiple images of the live event.

10. The method of claim 1, further comprising:
determining a search area in the image based on a direction of motion of the object in the image.

11. The method of claim 1, wherein:
the detecting which of the second edges are near the first edges comprises dilating the first edges to provide dilated first edges, and identifying which of the second edges intersect with the dilated first edges, the second edges which do not intersect the dilated first edges are not used to obtain the representation of the object.

12. The method of claim 1, further comprising:
correlating a template of the object with different portions of the image to determine a position of the representation of the object in the image.

13. The method of claim 12, further comprising:
determining an estimated size of the representation of the object in the image, a size of the template corresponds to the estimated size of the representation of the object in the image.

14. The method of claim 12, wherein:
the template comprises a model of the object; and
the method further comprises determining an orientation of the object, an orientation of the model corresponds to the orientation of the object.

15. The method of claim 1, wherein:
the object moves relative to a background object in the live event; and
the second edges which are not near the first edges comprise an edge of the background object.

16. The method of claim 1, further comprising:
obtaining data identifying a location of the object in the live event;
transforming the data identifying the location to an estimated position of the representation of the object in the image; and
determining a search area in the image for performing the first and second edge detection based on the estimated position of the representation of the object in the image.

17. The method of claim 16, wherein:
the data identifying the location comprises data which indicates at least one of a time or a distance since the object passed a known location in the live event.

18. The method of claim 1, further comprising:
combining a graphic with the image, the graphic is located in the image based on at least one of an orientation of the representation of the object in the image or a perspective of the representation of the object in the image.

19. The method of claim 1, further comprising:
combining a graphic with the image, the graphic is located in the image based on a position of the representation of the object in the image, the image is part of a video broadcast of the live event, and the graphic is combined with the image substantially in real time.

20. The method of claim 1, wherein:
the object comprises a vehicle and the live event comprises a race.

21. A system for processing image data, comprising:
at least one camera for capturing an image of a live event, the live event comprising an object; and
at least one processing facility which receives the image, the at least one processing facility: performs first edge detection to detect first edges which extend in a first direction in the image, performs second edge detection to detect second edges which extend in a second direction in the image, detects which of the second edges are near the first edges and which of the second edges are not near the first edges, discards the second edges which are detected to be not near the first edges and performs morphological processing on the first edges and the second edges which are detected to be near the first edges to obtain a representation of the object.

22. The system of claim 21, wherein:
the at least one processing facility identifies a direction of motion of the object, the first direction is perpendicular to a direction of motion of the object in the image, and the second direction is parallel to the direction of motion;
the object moves in the direction of motion relative to a background object in the live event; and
the second edges which are not near the first edges comprise an edge of the background object.

23. A method for processing image data, comprising:
obtaining an image of a live event which is captured by at least one camera, the live event comprising an object;
determining a direction of motion of the object in the image;
detecting first edges in the image which extend perpendicular to the direction of motion;
detecting second edges in the image which extend parallel to the direction of motion;
dilating the first edges to provide dilated first edges;
identifying which of the second edges intersect with the dilated first edges and which of the second edges do not intersect with the dilated first edges; and
performing morphological processing on the first edges and the second edges which intersect with the dilated first edges, but not with the second edges which do not intersect with the dilated first edges, to obtain a representation of the object.

24. The method of claim 23, further comprising:
updating at least one of registration or sensor data of the at least one camera based on a position of the representation of the object in the image.

25. The method of claim 23, further comprising:
combining a graphic with the image, the graphic is located in the image based on a position of the representation of the object in the image, the image is part of a video broadcast of the live event, and the graphic is combined with the image substantially in real time.

* * * * *